US012619281B2

(12) United States Patent
Kim et al.

(10) Patent No.: US 12,619,281 B2
(45) Date of Patent: May 5, 2026

(54) SLIDABLE ELECTRONIC APPARATUS HAVING DIGITIZER SEPARATION STRUCTURE, AND METHOD OF CONFIGURING TOUCH FILTER FOR SLIDABLE ELECTRONIC APPARATUS

(71) Applicant: SAMSUNG ELECTRONICS CO., LTD., Suwon-si (KR)

(72) Inventors: Minuk Kim, Suwon-si (KR); Bongjun Ko, Suwon-si (KR); Sungho Ahn, Suwon-si (KR); Bowon Jung, Suwon-si (KR); Jihyung Jung, Suwon-si (KR); Joungmin Cho, Suwon-si (KR); Sungdae Choi, Suwon-si (KR); Kwangtai Kim, Suwon-si (KR); Donghyun Yeom, Suwon-si (KR); Changryong Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 18/205,334

(22) Filed: Jun. 2, 2023

(65) Prior Publication Data

US 2023/0305596 A1      Sep. 28, 2023

Related U.S. Application Data

(63) Continuation of application No. PCT/KR2021/018156, filed on Dec. 2, 2021.

(30) Foreign Application Priority Data

Dec. 4, 2020    (KR) ........................ 10-2020-0168617
Mar. 2, 2021    (KR) ........................ 10-2021-0027591

(51) Int. Cl.
| | |
|---|---|
| *G06F 1/16* | (2006.01) |
| *G06F 3/0488* | (2022.01) |
| *H04M 1/02* | (2006.01) |

(52) U.S. Cl.
CPC .......... *G06F 1/1643* (2013.01); *G06F 1/1624* (2013.01); *G06F 1/1652* (2013.01);
(Continued)

(58) Field of Classification Search
CPC .... G06F 1/1643; G06F 1/1624; G06F 1/1652; G06F 3/0488; G06F 1/1677;
(Continued)

(56) References Cited

U.S. PATENT DOCUMENTS

| | | | |
|---|---|---|---|
| 10,656,771 B2 | 5/2020 | Holland et al. | |
| 11,244,658 B1 | 2/2022 | Hong et al. | |

(Continued)

FOREIGN PATENT DOCUMENTS

| | | |
|---|---|---|
| CN | 111727423 A | 9/2020 |
| CN | 111758082 A | 10/2020 |

(Continued)

OTHER PUBLICATIONS

Written Opinion (PCT/ISA/237) issued Mar. 3, 2022 from the International Searching Authority in International Application No. PCT/KR2021/018156.

(Continued)

*Primary Examiner* — David D Davis
(74) *Attorney, Agent, or Firm* — Sughrue Mion, PLLC

(57) ABSTRACT

An electronic apparatus includes a first housing and a second housing configured to be received inside the first housing and to be movable within the first housing to be exposed outside of the first housing. The electronic apparatus includes a flexible display including a first area and a second area. The electronic apparatus includes a first digitizer
(Continued)

module provided in the first housing below the flexible display and a second digitizer module provided in the second housing below the first digitizer module based on the second housing being received inside the first housing. The electronic apparatus includes a memory and a processor configured to detect a movement of the second housing with respect to the first housing, and configure a touch filter corresponding to each area of the flexible display based on the movement of the second housing.

20 Claims, 15 Drawing Sheets

(52) U.S. Cl.
CPC ........ *G06F 3/0488* (2013.01); *H04M 1/0237* (2013.01); *H04M 1/0268* (2013.01); *H04M 2250/22* (2013.01)

(58) Field of Classification Search
CPC ........... G06F 3/04182; H04M 1/0237; H04M 1/0268; H04M 2250/22
See application file for complete search history.

(56) References Cited

U.S. PATENT DOCUMENTS

| | | | |
|---|---|---|---|
| 11,886,238 B2* | 1/2024 | Shin ..................... | G06F 1/1616 |
| 2010/0117975 A1* | 5/2010 | Cho ..................... | G06F 1/1652 |
| | | | 345/173 |
| 2013/0058063 A1* | 3/2013 | O'Brien ................ | G06F 1/1624 |
| | | | 361/807 |
| 2015/0286288 A1 | 10/2015 | Lee et al. | |
| 2016/0110010 A1* | 4/2016 | Lee ..................... | H04M 1/0235 |
| | | | 345/173 |
| 2018/0246608 A1 | 8/2018 | Huh et al. | |
| 2019/0261519 A1* | 8/2019 | Park ..................... | G06F 1/1677 |
| 2019/0268455 A1 | 8/2019 | Baek et al. | |
| 2019/0312451 A1* | 10/2019 | An ..................... | G06F 1/1652 |
| 2019/0346954 A1* | 11/2019 | Jung ..................... | G06F 3/0416 |
| 2019/0384438 A1* | 12/2019 | Park ..................... | G06F 3/044 |
| 2020/0209998 A1 | 7/2020 | Shin et al. | |
| 2020/0236826 A1 | 7/2020 | Baek et al. | |
| 2021/0135151 A1 | 5/2021 | Baek et al. | |
| 2022/0043481 A1 | 2/2022 | Shin et al. | |
| 2022/0147170 A1 | 5/2022 | Park | |
| 2023/0099802 A1 | 3/2023 | An et al. | |

FOREIGN PATENT DOCUMENTS

| | | | |
|---|---|---|---|
| KR | 10-1581275 | B1 | 5/2010 |
| KR | 10-1521219 | B1 | 5/2015 |
| KR | 10-2015-0116281 | A | 10/2015 |
| KR | 10-2017-0047057 | A | 5/2017 |
| KR | 10-2019-0101184 | A | 8/2019 |
| KR | 10-2020-0070657 | A | 6/2020 |
| KR | 10-2020-0124099 | A | 11/2020 |
| KR | 10-2262991 | B1 | 6/2021 |
| KR | 10-2021-0092643 | A | 7/2021 |
| KR | 10-2289412 | B1 | 8/2021 |
| KR | 10-2021-0150942 | A | 12/2021 |
| WO | 2016/063373 | A1 | 4/2016 |
| WO | 2019/146865 | A1 | 8/2019 |
| WO | 2020/204247 | A1 | 10/2020 |

OTHER PUBLICATIONS

International Search Report (PCT/ISA/210) issued Mar. 3, 2022 from the International Searching Authority in International Application No. PCT/KR2021/018156.
Communication issued on Apr. 2, 2024 by the European Patent Office in counterpart European Application No. 21901049.3.
Communication dated Jul. 14, 2025, issued by the Korean Intellectual Property Office in Korean Application No. 10-2021-0027591.
Office Action issued on Mar. 18, 2026 by the China National Intellectual Property Administration in Chinese Patent Application No. 202180081321.7.

* cited by examiner

SLIDABLE ELECTRONIC APPARATUS HAVING DIGITIZER SEPARATION STRUCTURE, AND METHOD OF CONFIGURING TOUCH FILTER FOR SLIDABLE ELECTRONIC APPARATUS

CROSS-REFERENCE TO RELATED APPLICATIONS

This application is a continuation application of International Application No. PCT/KR2021/018156, filed on Dec. 2, 2021, which is based on and claims priority to Korean Patent Application No. 10-2020-0168617, filed on Dec. 4, 2020, and Korean Patent Application No. 10-2021-0027591, filed on Mar. 2, 2021, in the Korean Intellectual Property Office, the disclosures of which are incorporated by reference herein in their entireties.

BACKGROUND

1. Field

The disclosure relates to a slidable electronic apparatus having a digitizer separation structure, and a touch driving method of a slidable electronic apparatus.

2. Description of Related Art

In accordance with development of digital technologies, various types of electronic apparatuses such as a personal digital assistant (PDA), an electronic notebook, a smartphone, a tablet personal computer (PC), a wearable device have been widely used. An electronic apparatus may have a limited size for portability, and thus the size of a display may be limited. Accordingly, various types of electronic apparatuses may provide an expanded screen using a multi display, for example a dual display.

For example, multiple displays may be used to provide an extended screen by multi display. As another example, electronic apparatuses may be designed such that the sizes of screens gradually increase in the displays, and such that various services are provided to users through larger screens.

A multi display apparatus may have a form factor such as a foldable device, a rollable device, and a slidable device. The foldable device may include a foldable (or bendable) display or a flexible display, and may be folded or unfolded to be used. A rollable device or a slidable device may include a flexible display, and may be roll and receive the flexible display in a rear surface of the slidable device or extend the flexible display to a front surface to be used.

An electronic apparatus including a display having a designated size may include one digitizer layer and one touch layer on the display. The electronic apparatus may include a touch layer below a display and a digitizer layer below the touch layer. A slidable electronic apparatus may include a flexible display and a touch layer in the front surface of the flexible display. The touch layer may be bendable and thus may be arranged in one layer corresponding to the flexible display. However, the digitizer layer may be not bendable and thus may be difficult to arrange as one layer corresponding to the flexible display.

SUMMARY

Provided are a method and apparatus, wherein in the method performed by a slidable electronic apparatus including a first housing, and a second housing formed to be movable from the first housing, a first digitizer module is disposed below a flexible display included in the first housing, a second digitizer module is disposed below the first digitizer in a state in which the second housing is received inside the first housing, and a filter for each area of the flexible display exposed to the front surface of the slidable electronic apparatus is differently configured based on movement of the second housing with respect to the first housing.

Additional aspects will be set forth in part in the description which follows and, in part, will be apparent from the description, or may be learned by practice of the presented embodiments.

In accordance with an aspect of the disclosure, an electronic apparatus includes a first housing and a second housing configured to be received inside the first housing and to be movable within the first housing to be exposed outside of the first housing. The electronic apparatus further includes a flexible display including a first area and a second area, wherein the second area extends from the first area and is configured to be received on a rear surface of the second housing and to be exposed to the outside of the first housing through a front surface of the second housing as the second housing moves. The electronic apparatus further includes a first digitizer module provided in the first housing below the flexible display and a second digitizer module provided in the second housing below the first digitizer module based on the second housing being received inside the first housing. The electronic apparatus further includes a memory and a processor operatively connected to the flexible display, the first digitizer module, the second digitizer module, and the memory. The processor is configured to: detect a movement of the second housing with respect to the first housing; and configure a touch filter corresponding to each area of the flexible display based on the movement of the second housing.

The processor may be further configured to apply a first touch filter to the first area of the flexible display based on the second housing being received inside the first housing.

The processor may be further configured to apply a first touch filter to the first area of the flexible display and apply a second touch filter to the second area in a state based on the second housing being exposed outside of the first housing.

A first filter value corresponding to the first touch filter may be smaller than a second filter value corresponding to the second touch filter.

The processor may be further configured to, based on a first portion of the second housing being received inside the first housing and a second portion of the second housing being exposed outside of the first housing, apply a first touch filter to a third area of the flexible display, apply a second touch filter to a fourth area of the flexible display, and apply a third touch filter to a fifth area of the flexible display.

The third area may be smaller than the first area, the fourth area may be smaller than the second area, and the fifth area may include an area of the flexible display in which the first area and the second area overlap.

A first filter value corresponding to the first touch filter may be smaller than a second filter value corresponding to the second touch filter, and a third filter value corresponding to the third touch filter may be larger than a sum of the first filter value and the second filter value.

The processor may be further configured to control the first digitizer module to be driven and the second digitizer module to be not driven based on the second housing being received inside the first housing.

The processor may be further configured to control the first digitizer module and the second digitizer module to be driven based on the second housing being exposed outside of the first housing.

The processor may be configured to control a first partial area of the second digitizer module is not sensed based on a first portion of the second housing being received inside the first housing and a second portion of the second housing being exposed outside of the first housing.

The first partial area may correspond to the first portion of the second housing, the processor may be further configured to control the second digitizer module so that a second partial area of the second digitizer module is sensed, and the second partial area corresponds to the second portion of the second housing.

The processor may be further configured to apply the touch filter to the flexible display, and to update a touch baseline based on the touch filter.

In accordance with an aspect of the disclosure, an operation method of an electronic apparatus includes detecting a movement of a second housing of the electronic apparatus. The second housing is configured to be received inside a first housing of the electronic apparatus and to be movable within the first housing in order to be exposed outside of the first housing. The electronic apparatus includes a first digitizer module provided in the first housing below a flexible display of the electronic apparatus and a second digitizer module provided in the second housing below the first digitizer module based on the second housing being received inside the first housing. The operation method of the electronic apparatus further includes configuring a filter for each area of the flexible display of the electronic apparatus based on the movement of the second housing. The flexible display includes a first area, and a second area extending from the first area and configured to be received in a rear surface of the second housing or exposed outside of the first housing through a front surface of the second housing according to the movement of the second housing.

The configuring may include applying a first touch filter to the first area of the flexible display based on the second housing being received inside the first housing.

The configuring may include applying a first touch filter to the first area and applying a second touch filter to the second area based on the second housing being exposed outside of the first housing, and a first filter value corresponding to the first touch filter may be smaller than a second filter value corresponding to the second touch filter.

According to various embodiments, in an electronic apparatus including a first housing and a second housing formed to be movable from the first housing, in consideration of an unbendable characteristic of a digitizer, a first digitizer module may be disposed below a flexible display included in the first housing and a second digitizer module may be disposed below the first digitizer module in a state in which the second housing is received inside the first housing.

According to various embodiments, based on that a distance (or length) between the first digitizer module and the flexible display and a distance between the second digitizer module and the flexible display are different from each other, different touch filters may be applied to a first area of the flexible display, in which the first digitizer module is disposed, and a second area of the flexible display, in which the second digitizer module is disposed, thereby preventing touch misrecognition.

According to various embodiments, based on a portion of the second area, in which the second digitizer is disposed, of the flexible display being not exposed to the outside through the front surface of the electronic apparatus based on movement of the second housing from the first housing, a different touch filter from that applied to another portion of the second area may be applied to a portion of the second area not exposed to the outside, thereby minimizing external noise interference in case of touch sensing.

According to various embodiments, driving of the first digitizer module or the second digitizer module may be turned on or turned off based on movement of the second housing from the first housing, thereby minimizing touch noise interference due to a digitizer.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2A and FIG. 2B are views illustrating an example of a state change of an electronic apparatus according to various embodiments.

FIG. 6 is a view illustrating an example of an electronic apparatus including a digitizer module and a display driving circuit according to various embodiments.

DETAILED DESCRIPTION

Figure 1:
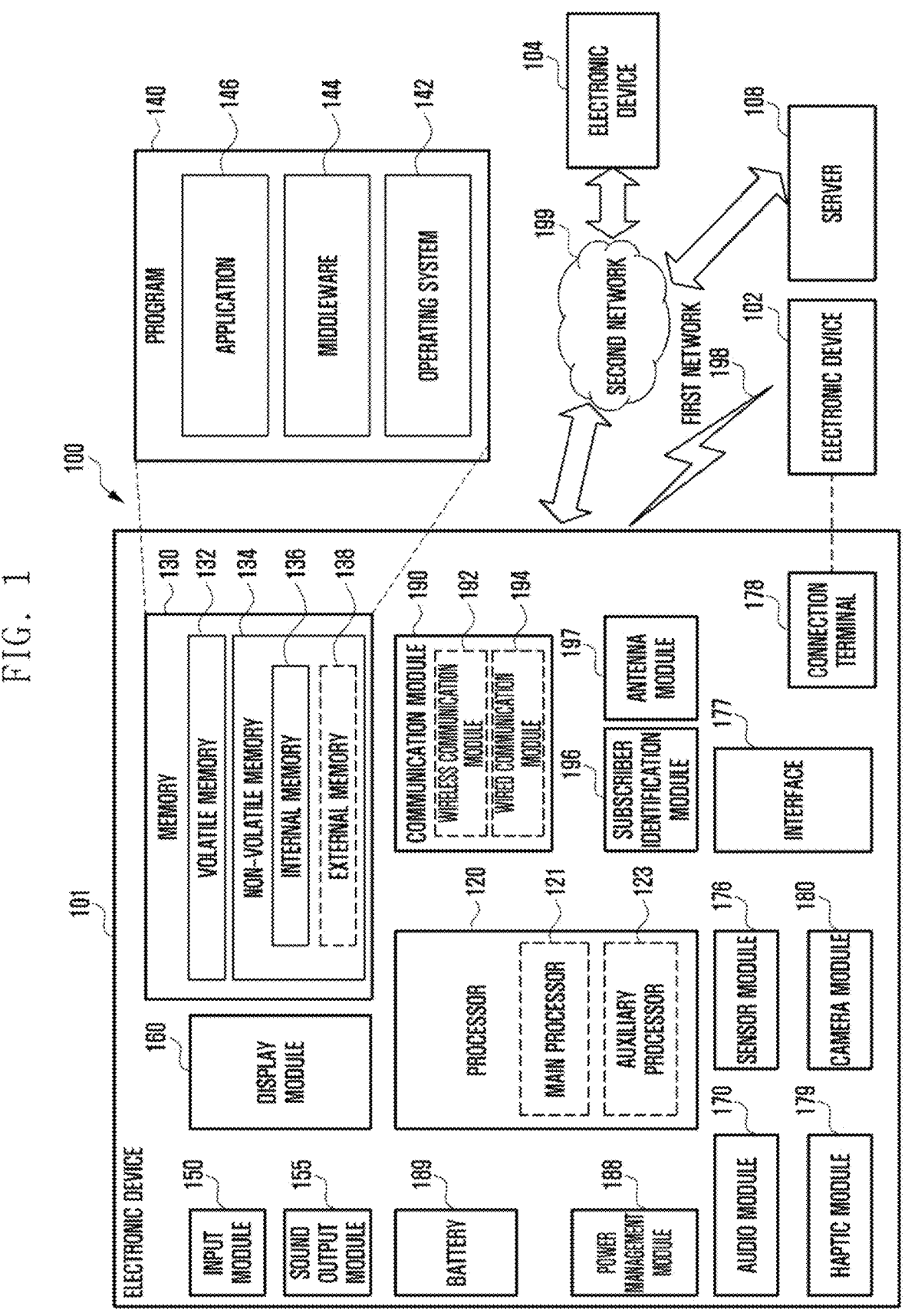
FIG. 1 is a block diagram illustrating an electronic apparatus in a network environment according to various embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device

101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
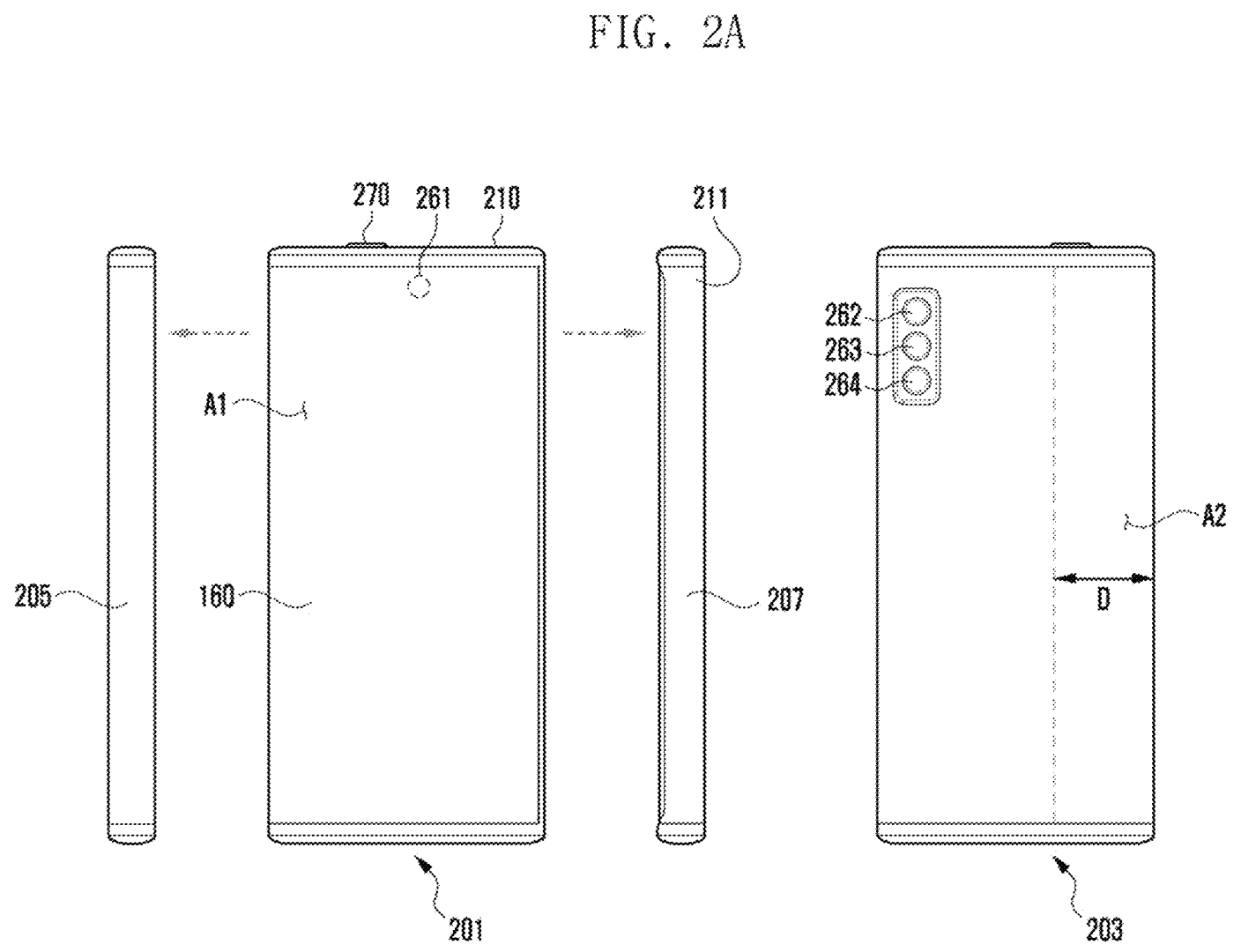
Figure 2B:
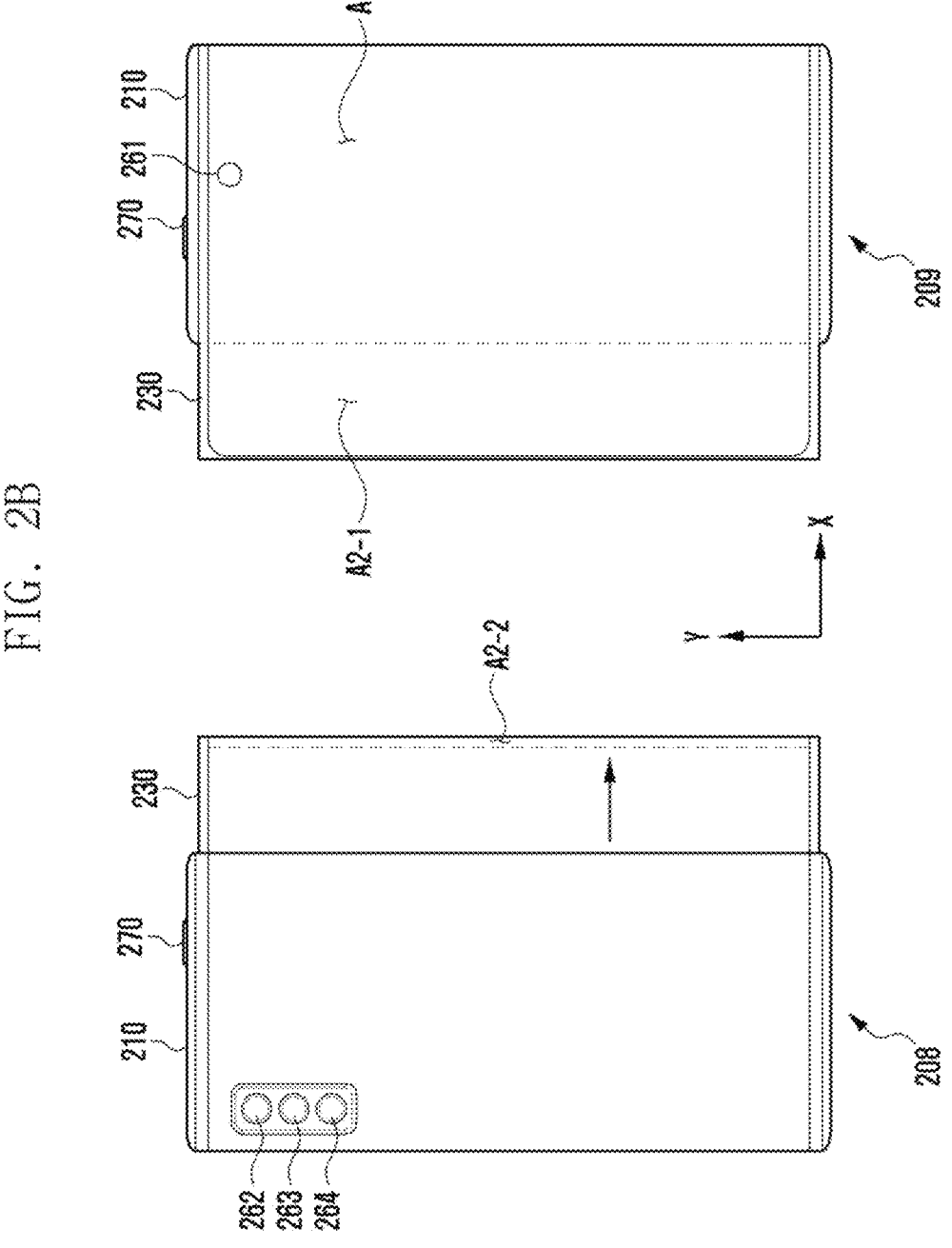

FIG. 2A and FIG. 2B are views illustrating an example of a state change of an electronic apparatus according to various embodiments.

FIG. 2A illustrates a front view 201 and a rear view 203 in a closed state of an electronic apparatus according to various embodiments.

Referring to FIG. 2A, the electronic apparatus (e.g., the electronic apparatus 101 in FIG. 1) according to various embodiments may include a first housing 210 and a second housing 230, wherein in the closed state of the electronic apparatus, the second housing 230 may be received inside the first housing 210, which may be for example a pocket type housing. The first housing 210 is a main housing of the electronic apparatus 101 and may receive various electrical and electronic components such as a main circuit board or a battery. The first housing 210 may be fixed and the second housing 230 may be disposed to be capable of reciprocating by a predetermined distance from the first housing 210 along a designated direction (e.g., the –x-axis direction D). The second housing 230 may be slidable within or along the first housing 210. A sliding structure may be provided between the first housing 210 and the second housing 230 for sliding of the second housing 230. The sliding structure (or a rollable hinge structure) may include, for example, a guide rail and a slide or a roller guided by the guide rail to move. However, embodiments are not limited thereto, and the sliding structure may have various forms.

A flexible display (e.g., the display module 160 in FIG. 1) of the electronic apparatus 101 may be included in the first housing 210 and the second housing 230. In the closed state of the electronic apparatus 101, a first area A1 of the display module 160 may be exposed through the front surface of the first housing 210 and a second area A2 of the display module 160 may be received in the rear surface of the second housing 230. The first area A1 may be fixed to the first housing 210 and the second area A2 may be received in the rear surface of the second housing 230 or moved to the front surface of the second housing 230. For example, in the closed state of the electronic apparatus 101, the first area A1 may face a first direction (e.g., the front surface) and the second area A2 may be received in the rear surface of the second housing 230 and face a second direction (e.g., the rear surface). Based on the second area A2 being received in the rear surface of the second housing 230, the second area A2 may not be visually exposed. In embodiments, based on the rear surfaces of the first housing 210 and the second housing 230 being formed of a transparent cover, the second area A2 may be visually exposed through the rear surfaces of the first housing 210 and the second housing 230 even if received in the rear surface of the second housing 230.

For example, the second area A2 may be a bendable part according to a state change of the electronic apparatus 101 and may be referred to using other terms such as a bendable area or a bendable section. According to a movement (e.g., sliding movement) of the second housing 230 with respect to the first housing 210, the second area A2 may be received (e.g., a slide-in operation) in the rear surface of the second housing 230, or moved (e.g., a slide-out operation) to the front surface of the second housing 230. The second area A2 may include an area received in a lateral area of the electronic apparatus 101 or the rear surface of the second housing 230 in the closed state of the electronic apparatus 101. The lateral area may correspond to a first lateral surface 205 extending from the first area A1 to the second area A2 of the display module 160. A second lateral surface 207 opposite to the first lateral surface 205 may include a plate 211 of the first housing 210 and a portion (e.g., the first area A1) of the display module 160 may be mounted on one surface of the plate 211. The first lateral surface 205 and the second lateral surface 207 may refer to lateral surfaces corresponding to a long length of two parallel lateral surfaces of the electronic apparatus 101.

A key input device 270 may be included in a third lateral surface (e.g., an upper lateral surface of the electronic apparatus 101) corresponding to a short length of two parallel lateral surfaces of the electronic apparatus 101. A microphone, a speaker, or the like may be included in a fourth lateral surface (e.g., a lower lateral surface of the electronic apparatus 101) corresponding to a short length of two parallel lateral surfaces of the electronic apparatus 101 or in the second lateral surface 207. According to an embodiment, the key input device 270 may be included in the second lateral surface 207 of the housing 210 or the fourth lateral surface. Depending on the appearance or use state, the electronic apparatus 101 may be designed to omit the described key input device 270 or to further include one or more key input devices. In an embodiment, the electronic apparatus 101 may include a key input device not described above, for example, a home key button or a touch pad disposed around the home key button. According to another embodiment, at least a portion of the key input device 270 may be disposed on an area of the first housing 210.

A first camera module 261 (e.g., the camera module 180 in FIG. 1) may be included in the first area A1 of the display module 160 or the first housing 210. For example, the first camera module 261 may be aligned in an opening (e.g., a through-hole or a notch) formed on the first area A1 and located inside the electronic apparatus 101. External light may penetrate through the opening and a partial area of the transparent cover overlapping the opening to be input to the first camera module 261. A location of the first camera module 261 may be fixed. For another example, the camera module 261 may be disposed in the internal space of the electronic apparatus 101 to perform functions thereof without being visually exposed through the display module 160. For example, in this case, the opening on an area of the display module 160, facing the sensor module may be unnecessary.

The first housing 210 and the second housing 230 may form a portion of the second area A2 of the rear surface of the electronic apparatus 101 with a transparent cover. The transparent cover may function to protect the display module 160 from an outside, for example an outside of the display module 160 or an outside of the electronic apparatus 101, and may be implemented of, for example, a flexible member, such as a plastic film (e.g., a polyimide film) or ultra-thin glass (UTG). The first housing 210 may include a multiple camera module (e.g., the camera module 180 in FIG. 1), which may include for example camera module 262, camera module 263, and camera module 264 (on the rear surface of the electronic apparatus 101.

The first camera module 261 or the multiple camera modules 262, 263, and 264 may have different properties (e.g., an angle of view) and include, for example, a dual camera or triple camera. In some embodiments, multiple camera modules 262, 263, and 264 may include lenses having different view angles and the electronic apparatus 101 may control to change a camera module performed in the electronic apparatus 101 based on user selection. For another example, the first camera module 261 or the multiple camera modules 262, 263, and 264 may include at least one of a wide-angle camera, a telephoto camera, a color camera, a monochrome camera, or an infrared (IR) camera (e.g., a time of flight (TOF) camera and a structured light camera). The IR camera may function as a portion of, for example, a sensor module (e.g., the sensor module 176 in FIG. 1). Locations of the first camera module 261 or the multiple camera modules 262, 263, and 264 may be changed according to implementation of the electronic apparatus 101.

FIG. 2B illustrates a front view 209 and a rear view 208 in an open state of an electronic apparatus according to various embodiments.

FIG. 2B may illustrate a state (e.g., the open state) in which the second housing 230 of the electronic apparatus

101 is moved from the first housing 210, which may correspond to a state in which a size of the display module 160 exposed to the front surface of the electronic apparatus 101 is increased. In the open state of the electronic apparatus 101, the display module 160 exposed to the front surface of the electronic apparatus 101 may correspond to the first area A1 and the second area A2. In the open state of the electronic apparatus 101, the first area A1 and the second area A2 may face a first direction (e.g., the front surface). In the open state of the electronic apparatus 101, the second area A2 may be exposed through the front surface of the second housing 230 or through the first lateral surface 205 of the electronic apparatus 101 and the front surface of the second housing 230.

The open state may correspond to a state in which the second housing 230 is maximally moved from the first housing 210, for example, a state in which the second housing is maximally moved in the first direction (e.g., the −x-axis direction). The open state may refer to a completely open state. An intermediate state may refer to a state between the closed state (e.g., FIG. 2A) and the open state (e.g., FIG. 2B). The intermediate state may refer to a state in which the second housing 230 may be further moved from the first housing 210. For example, a portion of the second area A2 exposed through the front surface of the electronic apparatus 101 in the intermediate state may be smaller than a portion of the second area A2 exposed through the front surface of the electronic apparatus 101 in the open state. Another portion of the second area A2 exposed through the rear surface of the electronic apparatus 101 in the intermediate state may be larger than another portion A2-2 of the second area A2 exposed through the front surface of the electronic apparatus 101 in the open state. The intermediate state may include multiple stages (e.g., stages not described above). In the electronic apparatus 101, a size of the display module 160 exposed through the front surface or the rear surface of the electronic apparatus 101 may be changed as much as a distance by which the second housing 230 is moved from the first housing 210.

Although it is described that the portion A2-2 of the second area A2 is received in the lateral surface or the rear surface of the second housing 230 in the open state in the drawing, embodiments are not limited thereto. For example, in the open state of the electronic apparatus 101, all of the first area A1 and the second area A2 of the display module 160 may be exposed through the front surface of the electronic apparatus 101 and the display module 160 may not be exposed through the rear surface of the electronic apparatus 101. However, embodiments are not limited to these examples.

According to various embodiments, in the open state of the electronic apparatus 101, a portion of the second area A2 may be exposed through the front surface of the second housing 230 and another portion of the second area A2 may be received in the lateral surface or the rear surface of the second housing 230. For example, a portion of the second area A2 exposed through the front surface of the electronic apparatus 101 may include a lateral area corresponding to the first lateral surface 205 and a portion A2-1 of the second area A2. In the open state of the electronic apparatus 101, another portion A2-2 of the second area A2 may be received in the lateral surface or the rear surface of the second housing 230. In embodiments, in the intermediate state of the electronic apparatus 101, a portion of the second area A2 may be exposed through the front surface of the electronic apparatus 101 and another portion A2-2 of the second area A2 may be received in the rear surface of the second housing 230.

According to various embodiments, the electronic apparatus 101 may detect a state of the electronic apparatus 101 by using a sensor module (e.g., the sensor module 176 in FIG. 1). For example, the electronic apparatus 101 may detect whether the electronic apparatus 101 is in the closed state, the intermediate state, or the open state, based on a sensing signal detected by the sensor module 176. In the case of the intermediate state of the electronic apparatus 101, the electronic apparatus 101 may detect, from the sensing signal, how much the second housing 230 moves from the first housing 210. In embodiments, the electronic apparatus 101 may detect how much the second housing 230 moves from the first housing 210 based on a slide structure.

According to various embodiments, based on the display module 160 being moved by a configured distance by external force, the electronic apparatus 101 may move (e.g., convert from the closed state to the open state, or from the open state to the closed state) the second housing 230 with respect to the first housing 210 due to an elastic structure included in the sliding structure without further external force (e.g., a semi-automatic slide operation). According to an embodiment, based on a signal being generated through the key input device 270 included in the electronic apparatus 101, the electronic apparatus 101 may move (e.g., convert from the closed state into the open state (or intermediate state), or from the open state (or intermediate state) into the closed state) the second housing 230 with respect to the first housing 210 by a driving device such as a motor connected to the display module 160. For example, based on a signal being produced through a hardware button or a software button provided through a screen, the electronic apparatus 101 may convert from the closed state into the open state (or intermediate state) or from the open state (or intermediate state) into the closed state.

Although FIG. 2A and FIG. 2B illustrate an example in which a size of the display of the electronic apparatus 101 is increased in the −x-axis direction (e.g., a left direction), embodiments are not limited thereto. For example, a size of the display of the electronic apparatus 101 may be increased in the +x-axis direction (e.g., a right direction), the +y-axis direction (e.g., an upward direction), or the −y-axis direction (e.g., a downward direction). That is, a size of the display of the electronic apparatus 101 may be increased in the horizontal direction, may be expanded in either the left or right direction, or both in the left/right direction. That is, a size of the display of the electronic apparatus 101 may be increased in the vertical direction, may be expanded in either the upward or downward direction, or both in the upward/downward direction. Hereinafter, an example in which a size of the display is increased in the left direction is described, but embodiments are not limited thereto.

Figure 3:
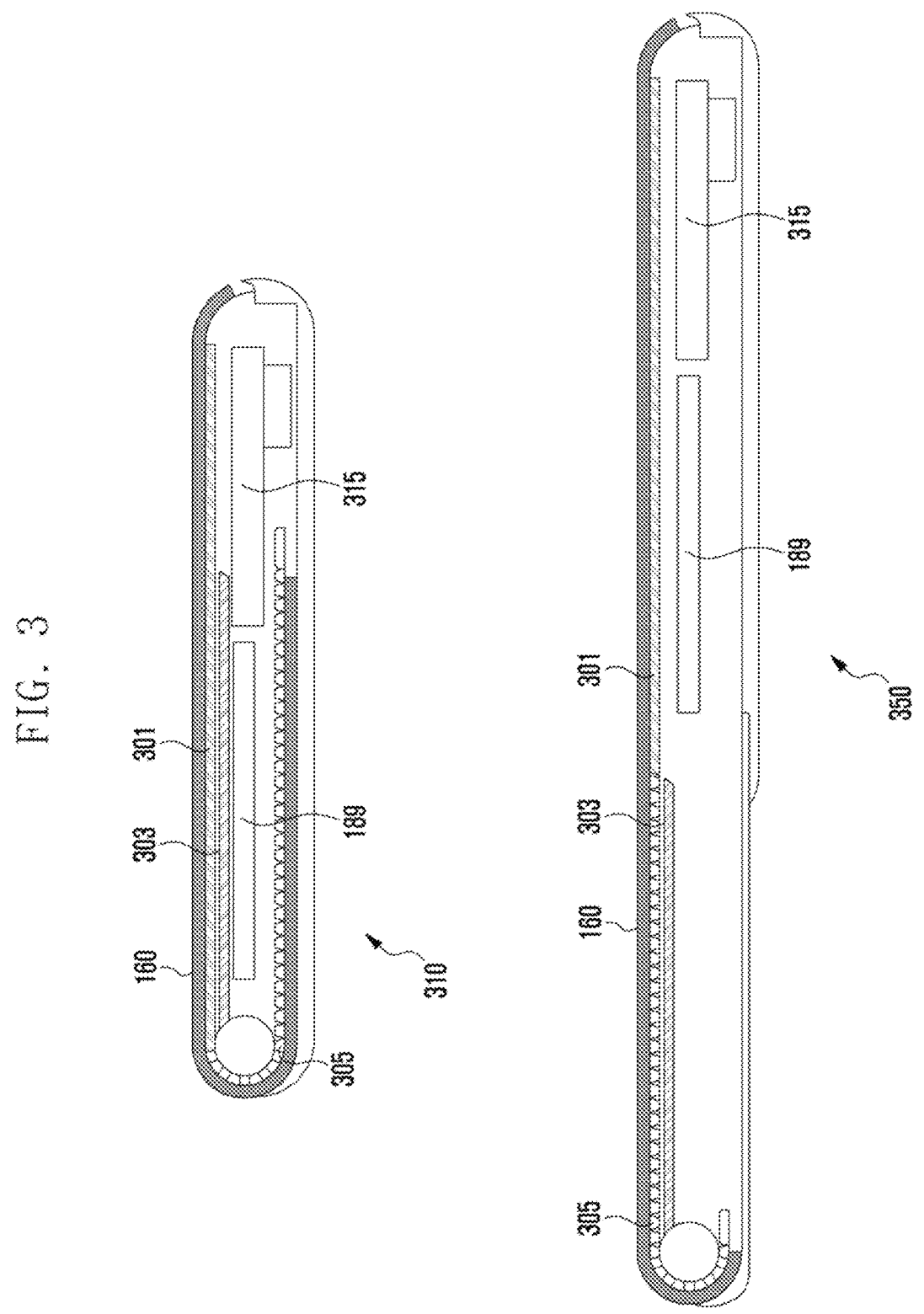
FIG. 3 is a view illustrating an example of a disposition of a digitizer module of an electronic apparatus according to various embodiments.

FIG. 3 is a view illustrating an example of disposition of a digitizer module of an electronic apparatus according to various embodiments.

Referring to FIG. 3, a slidable electronic apparatus (e.g., the electronic apparatus 101 in FIG. 1) according to various embodiments may include a first digitizer module 301 below a flexible display (e.g., the display module 160 in FIG. 1) and a second digitizer module 303 below the first digitizer module 301 in a closed state 310. The closed state 310 illustrated in FIG. 3 may correspond to a sectional view of a lateral surface (e.g., the upper lateral surface or the lower lateral surface of the electronic apparatus 101) correspond-ing to a short length of two parallel lateral surfaces of the electronic apparatus 101.

According to an embodiment, the electronic apparatus 101 may detect a magnetic field signal including a resonance frequency generated from a stylus pen through the first digitizer module 301 and the second digitizer module 303 by using an electromagnetic resonance (EMR) method. For example, when an alternating current is applied through multiple coils of the first digitizer module 301 and the second digitizer module 303, a current may flow through a coil inside the stylus pen adjacent to the first digitizer module 301 and the second digitizer module 303 according to the law of electromagnetic induction, a signal including a resonance frequency may be formed through a resonance circuit inside the stylus pen, and the first digitizer module 301 and the second digitizer module 303 may detect the resonance frequency. The resonance circuit may include at least one coil, an inductor, and/or an electronic element such as a capacitor. According to an embodiment, the resonance circuit may be used to change a strength or frequency of an electromagnetic field according to an operation state of a user. For example, the resonance circuit may provide various frequencies to recognize a hovering input, drawing input, button input, or erasing input.

The closed state 310 may correspond to a state in which a second housing (e.g., the second housing 230 in FIG. 2A and FIG. 2B) is included (received) in a first housing (e.g., the first housing 210 in FIG. 2A and FIG. 2B) of the electronic apparatus 101. In the closed state 310, the second housing 230 may be completely inserted into the first housing 210 so that the second housing 230 is not exposed to the outside. In the closed state 310, only a first area (e.g., the first area A1 in FIG. 2A and FIG. 2B) of the display module 160 may be exposed through an exterior surface (e.g., a first direction or the front surface of the electronic apparatus 101) and a second area (e.g., the second area A2 in FIG. 2A and FIG. 2B) of the display module 160 may not be exposed to the outside. In the closed state 310, the second area A2 may face a second direction (e.g., toward the rear surface of the electronic apparatus 101) opposite to the first direction (e.g., toward the front surface of the electronic apparatus 101). The first housing 210 may correspond to a main housing of the electronic apparatus 101 and may include a processor (e.g., the processor 120 in FIG. 1), a main circuit board 315 including a memory (e.g., the memory 130 in FIG. 1), or a battery (e.g., the battery 189 in FIG. 1).

The first digitizer module 301 may be included in the first housing 210 and the second digitizer module 303 may be included in the second housing 230. In FIG. 3, the first housing 210 may be fixed and the second housing 230 may have an area corresponding to the second housing 230 which may be exposed while extending. The second digitizer module 303 may be fixed to an internal bracket of the second housing 230 and may be exposed together when the second housing 230 moves. For example, a digitizer have charac-teristics which prevent bending, and thus a digitizer module (or layer) may be divided into two modules so that one module is included in the first housing 210 and the other module is included in the second housing 230. The digitizer module may be an input device used to read coordinates, which may be analog data, and input drawings or figures designed in digital form. For example, the first digitizer module 301 or the second digitizer module 303 may recog-nize coordinates (e.g., X and Y coordinates) corresponding to a contact location of a touch pen on the display module 160. Hereinafter, an example is described in which the display module 160 faces upward (e.g., a direction opposite to the direction of gravity) in the closed state 310, but embodiments are not limited thereto.

In the closed state 310, the first digitizer module 301 may be disposed below (or on the rear surface of) at least a portion of the display module 160. In the closed state 310, a slide structure 305, which may be for example a slide member, may be included below at least another portion of the display module 160. The slide structure 305 (or rollable hinge structure) may correspond to a structure for moving the second housing 230 with respect to the first housing 210. In the closed state 310, the second digitizer module 303 may be disposed below the first digitizer module 301. That is, in the closed state 310, the first digitizer module 301 may be disposed below (or on the rear surface of) the display module 160 and the second digitizer module 303 may be disposed below the first digitizer module 301. However, embodiments are not limited thereto. According to an embodiment, a metal layer may be disposed on the first digitizer module 301 or the second digitizer module 303, and a pattern may be formed on the metal layer disposed on the second digitizer module 303 to serve as a slide structure (lattice).

In the closed state 310, a first distance d1 (e.g., the first distance d1 in FIG. 4C) between the display module 160 and the first digitizer module 301 may be different from a second distance d2 (e.g., the second distance d2 in FIG. 4C) between the display module 160 and the second digitizer module 303. Because the first digitizer module 301 is disposed in the first housing 210, the second digitizer module 303 is disposed in the second housing 230, and the second digitizer module 303 is disposed below the first digitizer module 301, the first distance d1 may be shorter than the second distance d2 (e.g., d2>d1). For example, a distance (e.g., the second distance d2) of the second digitizer module 303 from the display module 160 may be longer than that of the first digitizer module 301 from the display module 160. A distance (e.g., the first distance d1) of the first digitizer module 301 from the display module 160 may be shorter than that of the second digitizer module 303 from the display module 160. The first distance d1 between the display module 160 and the first digitizer module 301 may indicate a distance from a window of the display module 160, where a touch input is contacted, to the rear surface of the first digitizer module 301. The second distance d2 between the display module 160 and the second digitizer module 303 may indicate a distance from a window of the display module 160, where a touch input is contacted, to the rear surface of the second digitizer module 303.

According to various embodiments, in the open state 350, the electronic apparatus 101 may include the first digitizer module 301 below the first area A1 of the display module 160 corresponding to the first housing 210 and second digitizer module 303 below the second area A2 of the display module 160 corresponding to the second housing 230. The open state 350 illustrated in FIG. 3 may correspond to a sectional view of a lateral surface (e.g., the upper lateral surface or the lower lateral surface of the electronic appa-ratus 101) corresponding to a short length of two parallel lateral surfaces of the electronic apparatus 101. The open state 350 may refer to a state in which the second housing 230 is exposed to the outside of the first housing 210. In the open state 350, the second housing 230 may be maximally moved to the outside of the first housing 210 so that the second housing 230 is exposed to the outside. The open state 350 may correspond to a state in which the first area A1 and the second area A2 of the display module 160 are exposed through an exterior surface (e.g., the front surface of the electronic apparatus 101). In the open state 350, the second area A2 may face the first direction (e.g., the front surface of the electronic apparatus 101) similarly to the first area A1.

In the open state 350, the first digitizer module 301 may be disposed below the first area A1 of the display module 160 corresponding to the first housing 210 and second digitizer module 303 may be disposed below the second area A2 of the display module 160 corresponding to the second housing 230. According to various embodiments, a slide structure 305, which may be for example a slide member, may be included between the second digitizer module 303 and the second area A2 of the display module 160.

In the open state 350, a first distance d1 between the display module 160 and the first digitizer module 301 may be different from a second distance d2 between the display module 160 and the second digitizer module 303. Because the first digitizer module 301 is disposed in the first housing 210, the second digitizer module 303 is disposed in the second housing 230, the second housing 230 is formed to be received inside the first housing 210, and the second digitizer module 303 is disposed below the first digitizer module 301, the first distance d1 may be shorter than the second distance d2. A distance (e.g., the second distance d2) of the second digitizer module 303 from the display module 160 may be longer than that of the first digitizer module 301 from the display module 160. A distance (e.g., the first distance d1) of the first digitizer module 301 from the display module 160 may be shorter than that of the second digitizer module 303 from the display module 160. The first distance d1 between the display module 160 and the first digitizer module 301 may indicate a distance from a window of the display module 160, where a touch input is contacted, to the rear surface of the first digitizer module 301. The second distance d2 between the display module 160 and the second digitizer module 303 may indicate a distance from a window of the display module 160, where a touch input is contacted, to the rear surface of the second digitizer module 303. According to an embodiment the first digitizer module 301 and the second digitizer module 303 have a height difference (e.g., a difference between the first distance d1 and the second distance d2) therebetween, a step compensation layer may be disposed between the second digitizer module 303 and the slide structure (lattice).

Figure 4A:
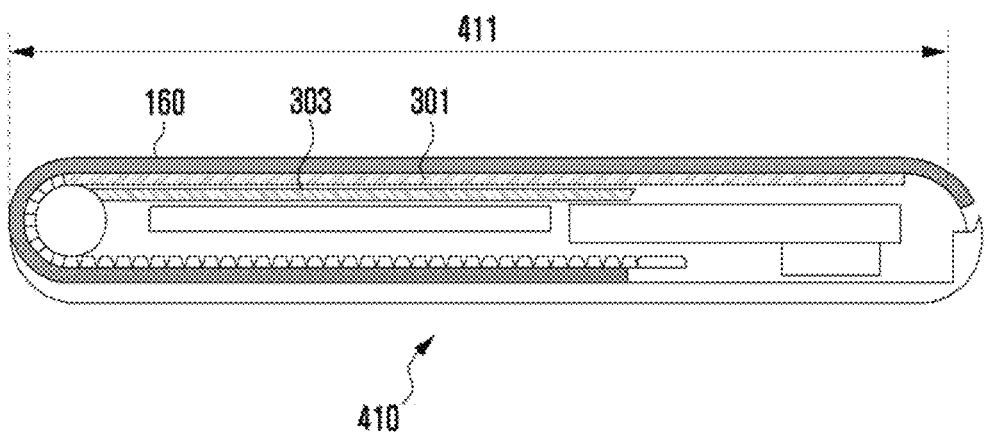
FIG. 4A to FIG. 4C area views illustrating an example of application of a touch filter based on movement of a housing of an electronic apparatus according to various embodiments.
Figure 4B:
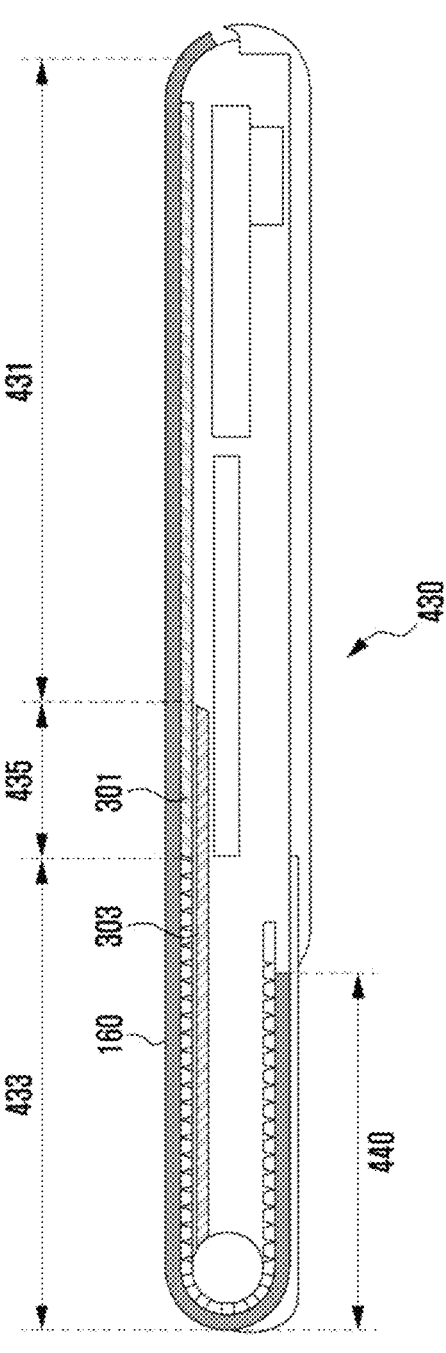
Figure 4C:
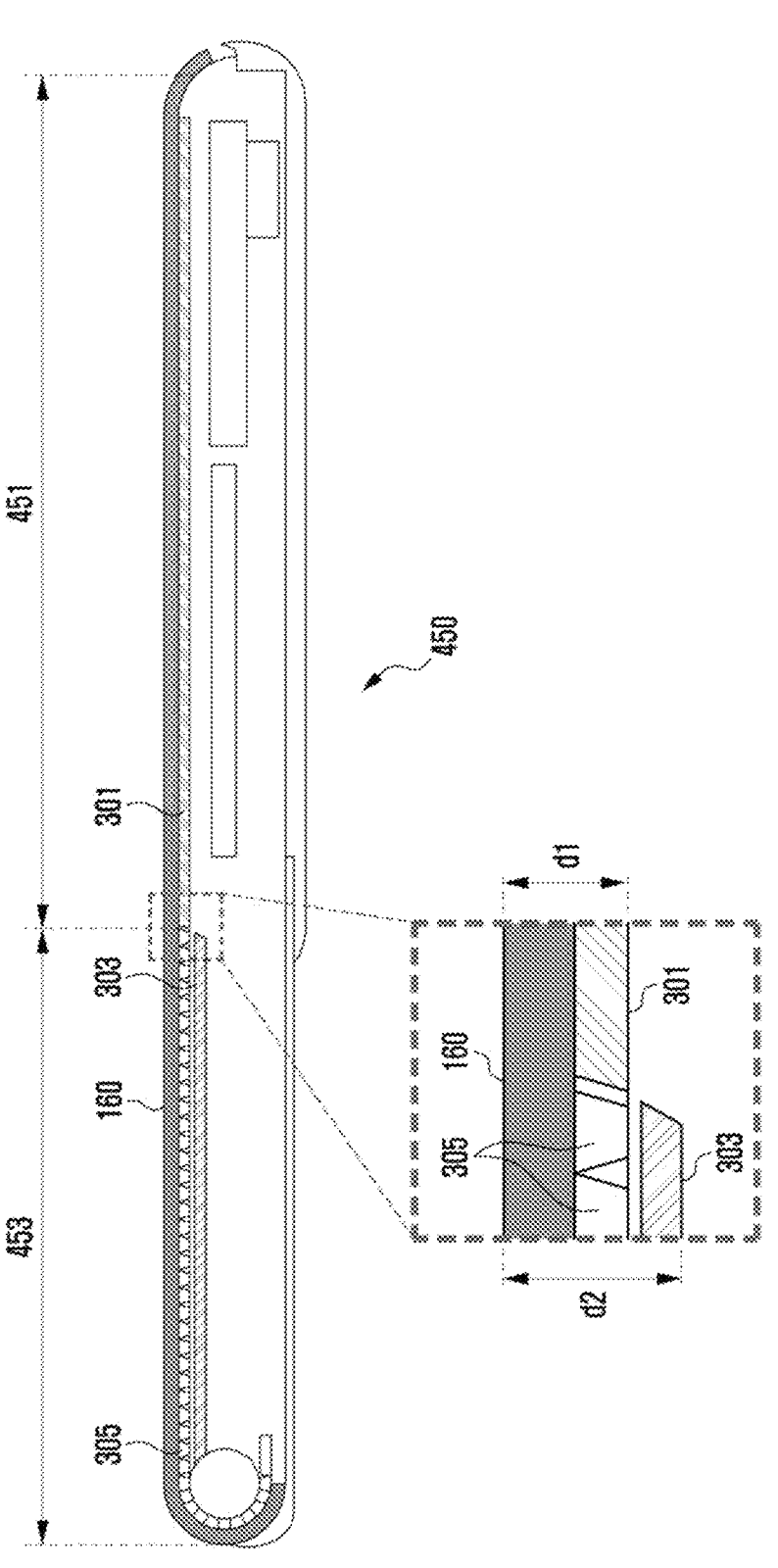

FIG. 4A to FIG. 4C area views illustrating an example of application of a touch filter based on movement of a housing of an electronic apparatus according to various embodiments.

FIG. 4A is a view illustrating an example of application of a touch filter in the closed state of an electronic apparatus according to various embodiments.

Referring to FIG. 4A, a slidable electronic apparatus (e.g., the electronic apparatus 101 in FIG. 1) according to various embodiments may apply a first touch filter with respect to a first area 411 (e.g., the first area A1 in FIGS. 2A and 2B) of a flexible display (e.g., the display module 160 in FIG. 1) in a closed state 410. The closed state 410 may correspond to a state in which a second housing (e.g., the second housing 230 in FIG. 2A and FIG. 2B) is included (received) in a first housing (e.g., the first housing 210 in FIG. 2A and FIG. 2B) of the electronic apparatus 101. In the closed state 410, the second housing 230 may be completely inserted into the first housing 210 so that the second housing 230 is not exposed to an outside, for example an outside of the first housing 210 or an outside of the electronic apparatus 101. In the closed state 410, only a first area A1 of the display module 160 may be exposed through an exterior surface (e.g., a first direction or the front surface of the electronic apparatus 101) and a second area (e.g., the second area A2 in FIG. 2A and FIG. 2B) of the display module 160 may not be exposed to the outside. The first area 411 in FIG. 4A may correspond to the first area A1 in FIG. 2A and FIG. 2B. In embodiments, the first area 411 in FIG. 4A may be identical to the first area A1 in FIG. 2A and FIG. 2B.

According to various embodiments, the display module 160 may include a touch electrode layer (or touch layer) on a display panel and a first digitizer module (e.g., the first digitizer module 301 in FIG. 3) or a second digitizer module (e.g., the second digitizer module 303 in FIG. 3) below the display panel. In embodiments, the display module 160 may include an add-on method for attaching a separate touch screen panel (TSP) to a display, an on-cell method for patterning on a lower part of a polarization layer or an upper part of an encapsulation layer, or an in-cell method for disposing on a display internal thin film transistor (TFT) substrate, and may include the first digitizer module 301 or the second digitizer module 303 below the display panel. The first digitizer module 301 may be disposed in the first housing 210 corresponding to the first area A1 of the display module 160. The second digitizer module 303 may be disposed in the second housing 230 corresponding to the second area A2 of the display module 160.

The touch layer (or touch sensor) may be affected by external noise, noise by a display panel, or noise by a digitizer module. Based on the touch layer being affected by noise, touch misrecognition may occur. Furthermore, based on two digitizer modules (e.g., the first digitizer module 301 and the second digitizer module 303) being included, the touch layer may be affected differently depending on an arrangement structure of two digitizer modules. Because the arrangement structure of two digitizer modules may be changed according to movement of the second housing 230 with respect to the first housing 210, there may be provided a method for reducing touch noise based on the movement of the second housing 230.

In the closed state 410 in which the first digitizer module 301 is disposed below the display module 160 and the second digitizer module 303 is disposed below the first digitizer module 301, the electronic apparatus 101 may apply the first touch filter to the first area A1 of the display module 160. The first touch filter may be a filter applied to an electronic apparatus including one digitizer module and one touch layer rather than a structure including two digitizer modules. The first filter may be configured in advance by the first distance d1 between the display module 160 and the first digitizer module 301.

The first touch filter may equalize a touch baseline corresponding to the first area 411 in order to remove touch noise. The touch baseline may refer to a capacitor value associated with touch detection. Considering that the touch layer may detect a touch input based on a capacitor value change, based on the baseline being not equalized, an analog front end (AFE) value may be distorted, and touch misrecognition may occur due to an influence of noise. Because only the first area 411 is exposed to the outside in the closed state 410 of the electronic apparatus 101, the first touch filter may be applied to the first area 411 based on the first distance d1 between the display module 160 and the first digitizer module 301. Based on the first touch filter being applied to the first area 411, the touch baseline of the first area 411 may be updated based on the first touch filter.

According to various embodiments, in the closed state 410, the electronic apparatus 101 may drive (e.g., turn on or activate) the first digitizer module 301 and may not drive (e.g., turn off or deactivate) the second digitizer module 303. Because only the first area 411 is exposed to the outside in the closed state 410 of the electronic apparatus 101, the first digitizer module 301 may be used, and the second digitizer module 303 may not be used. The second digitizer module 303 may be used based on the second area A2 being exposed, and thus may not be used based on only the first area 411 being exposed to the outside. The electronic apparatus 101 may not drive the second digitizer module 303 when it is unused in order to minimize touch noise due to the second digitizer module 303. In embodiments, in order to minimize noise interference due to the first digitizer module 301 and the second digitizer module 303 and reduce power consumption, the second digitizer module 303 may be not driven in the closed state 410.

FIG. 4B is a view illustrating an example of application of a touch filter in the intermediate state of an electronic apparatus according to various embodiments.

Referring to FIG. 4B, in the intermediate state 430, the electronic apparatus 101 may apply a first touch filter to a first area 431 of the display module 160, a second touch filter to a second area 433 of the display module 160, and a third touch filter to a third area 435 of the display module 160. The intermediate state 430 may refer to a state in which a portion (e.g., the second area 433) of the second housing 230 is exposed to the outside of the first housing 210. In the intermediate state 430, a portion (e.g., the second area 433) of the first area A1 and the second area A2 of the display module 160 may be exposed through an exterior surface (e.g., the front surface of the electronic apparatus 101), and another portion 440 of the second area A2 may face an opposite direction (e.g., the second direction or the rear surface of the electronic apparatus 101) to the first area A1.

The first area 431 may be an area exposed through the first housing 210 and not overlapping the second housing 230. The first area 431 may be an area smaller than the first area A1 in FIG. 2A and FIG. 2B. For example, the first area A1 in FIG. 2A and FIG. 2B may refer to an area obtained by combining the first area 431 and the third area 435 of FIG. 4B. The second area 433 may be an area where the second housing 230 is exposed to the outside of the first housing 210 and which does not overlap the first housing 210. The second area 433 may correspond to a portion (e.g., A2-1) of the second area A2 in FIG. 2A and FIG. 2B and may be an area smaller than the second area A2 in FIG. 2A and FIG. 2B. The third area 435 may be an area where the first housing 210 overlaps the second housing 230 when the second housing 230 is received inside the first housing 210. The third area 435 may correspond to a portion of the first area A1 in FIG. 2A and FIG. 2B or another portion of the second area A2 in FIG. 2A and FIG. 2B.

For example, the second area 433 may be a portion (e.g., A2-1) of the second area A2 of the display module 160, which a user may contact as the second housing 230 moves. The third area 435 may be a portion of the first area A1 of the display module 160, which a user may contact and another portion of the second area A2 of the display module 160, which a user may not contact. In embodiments, the third area 435 may refer to another portion of the second area A2 covered by the first area A1 and not visible to a user.

A first touch filter f1 may be configured based on the first distance d1 between the display module 160 and the first digitizer module 301. A second touch filter f2 may be configured based on the first distance d1 between the display module 160 and the first digitizer module 301 or the second distance d2 between the display module 160 and the second digitizer module 303. Because the first digitizer module 301 is disposed in the first housing 210, the second digitizer module 303 is disposed in the second housing 230, and the second digitizer module 303 is disposed below the first digitizer module 301, the first distance d1 may be shorter than the second distance d2.

Because a user may contact the display module 160 while the second digitizer module 303 corresponding to the second area 433 is driven, the second area 433 may be affected by the second digitizer module 303. For example, the second touch filter f2 may be configured by a value obtained by subtracting the first distance d1 from the second distance d2 and then dividing the difference by second distance d2. The second touch filter f2 may be smaller than the first touch filter f1. For example, in embodiments a value or coefficient corresponding to the second touch filter f2 may be smaller than a value or coefficient corresponding the first touch filter f1, or an effect of the second touch filter f2 may be smaller than an effect of the first touch filter f1.

Because the third area 435 corresponds to a portion of the first area A1 and a portion of the second area A2, the first digitizer module 301 corresponding to the third area 435 may be driven and the second digitizer module 303 corresponding to the third area 435 may be driven or may not be driven. The third area 435 may be affected by the first digitizer module 301 and the second digitizer module 303. The third touch filter may be configured based on the first touch filter and the second touch filter. For example, a third touch filter f3 may be equal to or greater than a sum value of the first touch filter f1 and the second touch filter f2. For example, in embodiments a value or coefficient corresponding to the third touch filter f3 may be equal to or greater than a sum of values or coefficients corresponding the first touch filter f1 and the second touch filter f2, or an effect of the third touch filter f3 may be equal to or greater than a sum of the effects of the first touch filter f1 and the second touch filter f2. For example, in the intermediate state 430, the electronic apparatus 101 may drive the entirety of the second digitizer module 303 or may not drive a partial area (e.g., the third area 435) of the second digitizer module 303. Based on the second digitizer module 303 corresponding to the third area 435 being driven, the electronic apparatus 101 may apply the third touch filter f3 to the third area 435. In embodiments, based on the second digitizer module 303 corresponding to the third area 435 being not driven, the electronic apparatus 101 may apply the first touch filter f1 or the second touch filter f2 to the third area 435. In embodiments, regardless of driving of the second digitizer module 303 corresponding to the third area 435, the electronic apparatus 101 may apply the third touch filter f3 to the third area 435. However, embodiments are not limited to these examples.

According to various embodiments, a distance may be inversely proportional to touch noise. For example, because the touch noise increases in the order of the third area 435, the first area 431, and the second area 433, a touch filter value may increase in the order of the third area 435, the first area 431, and the second area 433. For example, because the touch noise of the third area 435 where the first digitizer module 301 and the second digitizer module 303 overlap each other is the largest, the value of the third touch filter f3 applied to the third area 435 may be the largest.

According to various embodiments, the electronic apparatus 101 may update a touch base line based on the movement of the second housing 230 with respect to the first housing 210. The movement of the second housing 230 with respect to the first housing 210 may refer to state conversion (e.g., a change) of the electronic apparatus 101 from the closed state to the intermediate state or the open state or state conversion of the electronic apparatus 101 from the open state to the intermediate state or the closed state. The electronic apparatus 101 may update the touch baseline based on the state conversion (change) of the electronic apparatus 101.

For example, based on the first touch filter being applied to the first area 431, the touch baseline of the first area 431 may be updated based on the first touch filter. Based on the second touch filter being applied to the second area 433, the touch baseline of the second area 433 may be updated based on the second touch filter. Based on the third touch filter being applied to the third area 435, the touch baseline of the third area 435 may be updated based on the third touch filter. In embodiments, based on the first touch filter or the second touch filter being applied to the third area 435, the touch baseline of the third area 435 may be updated based on the first touch filter or the second touch filter.

According to various embodiments, in the intermediate state 430, the electronic apparatus 101 may drive (e.g., turn on or activate) the first digitizer module 301 and drive the entire area of the second digitizer module 303, or may not drive (e.g., turn off or deactivate) a partial area of the second digitizer module 303. In the intermediate state 430, the electronic apparatus 101 may drive the first digitizer module 301 in correspondence to the first area 431 and the third area 435 and drive the second digitizer module 303 in correspondence to the second area 433 or the third area 435. In embodiments, in the second digitizer module 303, a partial area of the second digitizer module 303 corresponding to the second area 433 may be driven and a partial area of the second digitizer module 303 corresponding to the third area 435 may not be driven.

The electronic apparatus 101 may divide the first digitizer module 301 or the second digitizer module 303 into multiple areas and control a partial area to be sensed and control another partial area not to be sensed. For example, in order to minimize noise interference by the first digitizer module 301 and the second digitizer module 303 and reduce power consumption, in the intermediate state 430, the electronic apparatus 101 may control the first digitizer module 301 corresponding to the first area 431 and the third area 435 and another portion of the second digitizer module 303 corresponding to the second area 433 to be sensed and control a partial area of the second digitizer module 303 corresponding to the third area 435 not to be sensed.

According to various embodiments, because the driving of the first digitizer module 301 or the second digitizer module 303 may cause touch noise, the electronic apparatus 101 may apply different filters for respective areas based on the driving of the first digitizer module 301 or the second digitizer module 303. For example, the first digitizer module 301 may be driven in the first area 431, the second digitizer module 303 may be driven in the second area 433, the first digitizer module 301 may be driven and the second digitizer module 303 may not be driven in the third area 435, and the second digitizer module 303 may be disposed below the first digitizer module 301. Accordingly, the electronic apparatus 101 may apply the first touch filter f1 to the first area 431, the second touch filter f2 to the second area 433, and the third touch filter f3 to the third area 435. The value configured to the first touch filter f1 may be smaller than that of the second touch filter f2 and larger than that of the third touch filter f3.

According to various embodiments, in the intermediate state 430 of the electronic apparatus 101, the electronic apparatus 101 may determine a touch filter to be applied to the third area 435 based on a driving method of the second digitizer module 303. Based on the entire area of the second digitizer module 303 being driven in the intermediate state 430 of the electronic apparatus 101, the electronic apparatus 101 may apply the third touch filter to the third area 435. In embodiments, based on only a partial area (e.g., the second area 433) of the second digitizer module 303 being driven in the intermediate state 430 of the electronic apparatus 101, the electronic apparatus 101 may apply the first touch filter or the second touch filter to the third area 435. In embodiments, regardless of the driving state of the second digitizer module 303 in the intermediate state 430 of the electronic apparatus 101, the electronic apparatus 101 may apply the third touch filter to the third area 435.

According to various embodiments, the electronic apparatus 101 may apply a filter value (for example an intermediate filter value) between the first touch filter f1 and the third touch filter f3 to a configured area (e.g., a boundary area) between the first area 431 and the third area 435 and apply a filter value between the second touch filter f2 and the third touch filter f3 to a configured area between the second area 433 and the third area 435. In embodiments, the electronic apparatus 101 may apply the first touch filter f1 (e.g., a larger value between the first touch filter f1 and the third touch filter f3) to a configured area (e.g., a boundary area) between the first area 431 and the third area 435 and apply the second touch filter f2 (e.g., a larger value between the second touch filter f2 and the third touch filter f3) to a configured area between the second area 433 and the third area 435.

FIG. 4C is a view illustrating an example of application of a touch filter in the open state of an electronic apparatus according to various embodiments.

Referring to FIG. 4C, in the open state 450, the electronic apparatus 101 may apply a first touch filter to a first area 451 of the display module 160, and a second touch filter to a second area 453 of the display module 160. The open state 450 may refer to a state in which the second housing 230 is exposed to the outside of the first housing 210. In the open state 450, the second housing 230 may be maximally moved to the outside of the first housing 210 so that the second housing 230 is exposed to the outside. The open state 450 may correspond to a state in which the first area A1 and the second area A2 of the display module 160 are exposed through an exterior surface (e.g., front surface of the electronic apparatus 101). In the open state 450, the second area A2 may face the first direction (e.g., the front surface of the electronic apparatus 101) similarly to the first area A1.

In the open state 450, the first area 451 may be an area corresponding to the first housing 210, exposed to the outside (e.g., in the first direction or through the front surface of the electronic apparatus 101) through the first housing 210, and not overlapping the second housing 230. The first area 451 may correspond to the first area A1 in FIG. 2A and FIG. 2B and may be identical to the first area A1. The second area 453 may be an area corresponding to the second housing 230, exposed to the outside (e.g., in the first direction or through the front surface of the electronic apparatus 101) through the second housing 230, and not overlapping the first housing 210. The second area 453 may corresponding to the second area A2 in FIG. 2A and FIG. 2B and may be identical to the second area A2.

The first touch filter f1 may be configured based on the first distance d1 between the display module 160 and the first digitizer module 301. The second touch filter may be configured based on the first distance d1 between the display module 160 and the first digitizer module 301 or the second distance d2 between the display module 160 and the second digitizer module 303. The first distance d1 may be shorter than the second distance d2 (e.g., d2>d1). Because a user may contact the display module 160 while the second digitizer module 303 corresponding to the second area 453 is driven, the second area 453 may be affected by the second digitizer module 303. For example, the second touch filter f2 may be configured based on a value obtained by subtracting the first distance d1 from the second distance d2 and then dividing the difference by second distance d2. The second touch filter f2 may be smaller than the first touch filter f1.

According to various embodiments, the electronic apparatus 101 may update a touch baseline based on the movement of the second housing 230 with respect to the first housing 210. The movement of the second housing 230 with respect to the first housing 210 may refer to state conversion (change) of the electronic apparatus 101 from the closed state to the open state or state conversion (change) of the electronic apparatus 101 from the open state to the closed state. The electronic apparatus 101 may update the touch baseline based on the state conversion (change) of the electronic apparatus 101. For example, based on the first touch filter being applied to the first area 451, the touch baseline of the first area 451 may be updated based on the first touch filter. Based on the second touch filter being applied to the second area 453, the touch baseline of the second area 453 may be updated based on the second touch filter.

According to various embodiments, in the open state 450, the electronic apparatus 101 may drive (e.g., turn on or activate) the first digitizer module 301 and may drive (e.g., turn on or activate) the second digitizer module 303. In the open state 450, the electronic apparatus 101 may drive the first digitizer module 301 in correspondence to the first area 431 and drive the second digitizer module 303 in correspondence to the second area 433. Because the driving of the first digitizer module 301 or the second digitizer module 303 may cause touch noise, the electronic apparatus 101 may apply different filters for respective areas based on the driving of the first digitizer module 301 or the second digitizer module 303. For example, the first digitizer module 301 may be driven in the first area 451, the second digitizer module 303 may be driven in the second area 453, and digitizer modules may not overlap each other in the first area 451 and the second area 453. Accordingly, the electronic apparatus 101 may apply the first touch filter f1 to the first area 451 and the second touch filter f2 to the second area 453. The value configured to the first touch filter f1 may be smaller than that of the second touch filter f2.

Figure 5A:
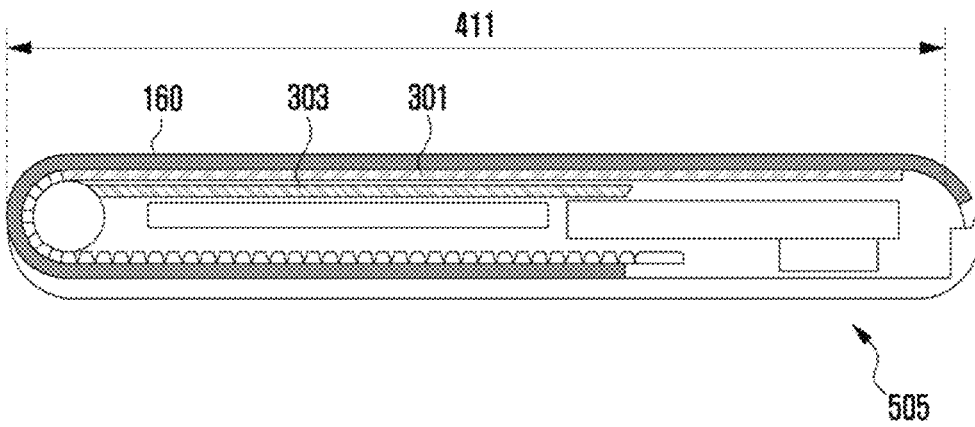
FIG. 5A to FIG. 5C area views illustrating an example of touch noise according to application of a touch filter to an electronic apparatus according to various embodiments.
Figure 5A:
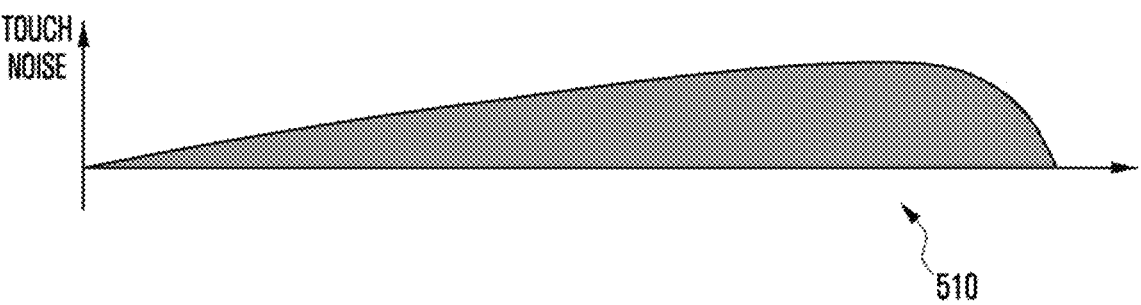
Figure 5B:
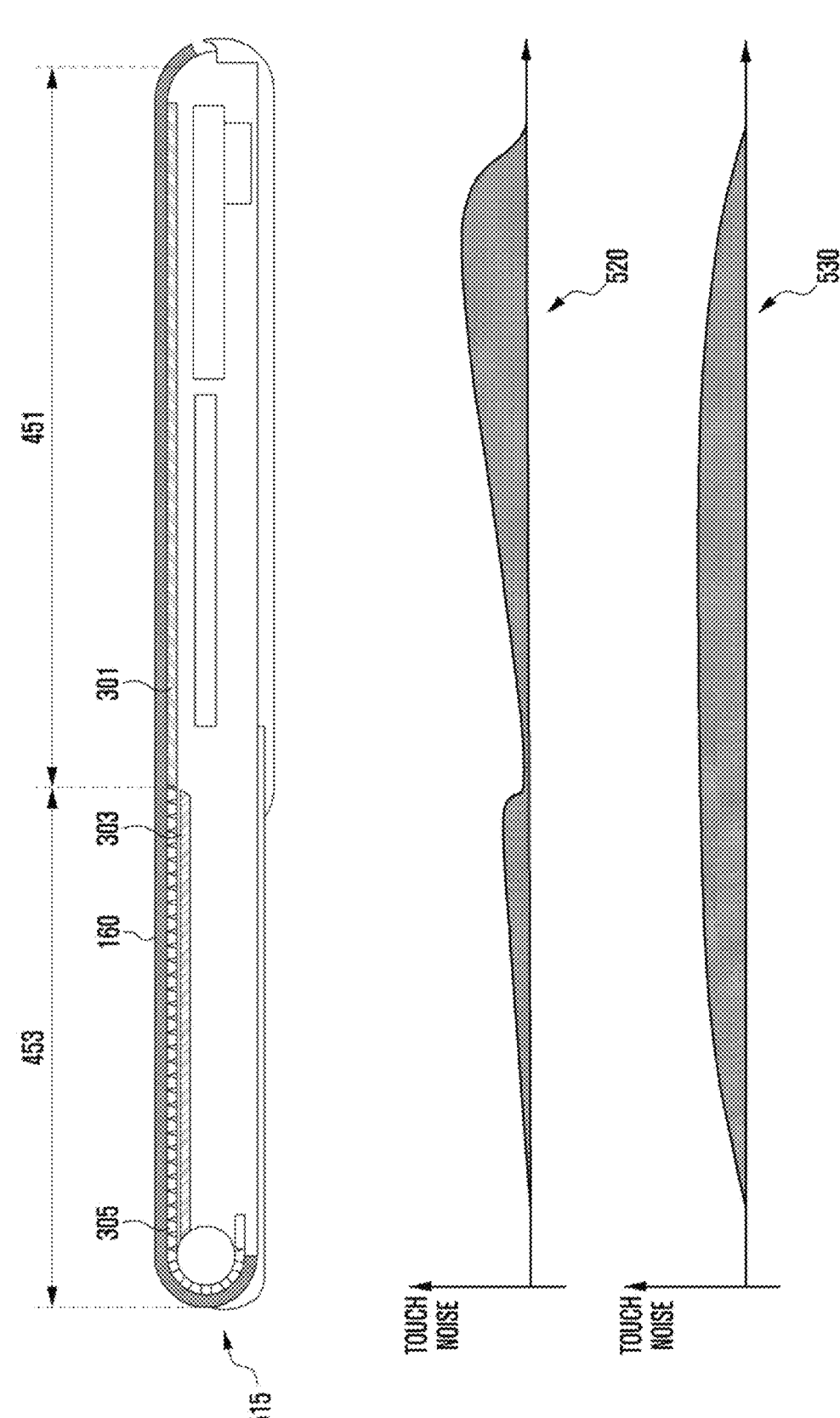
Figure 5C:
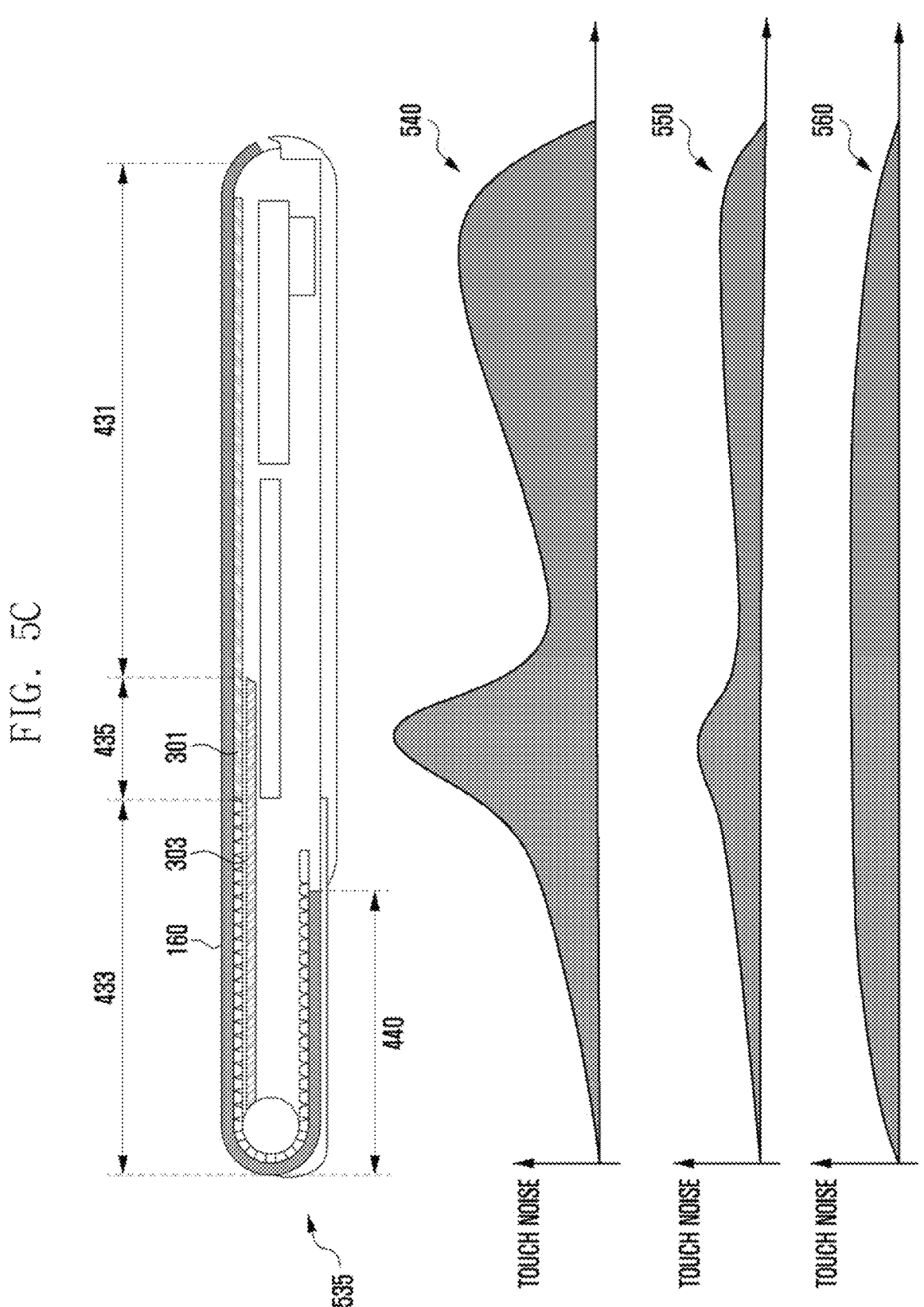

FIG. 5A to FIG. 5C area views illustrating an example of touch noise according to application of a touch filter to an electronic apparatus according to various embodiments.

FIG. 5A is a view illustrating an example of application of a touch filter in the closed state of an electronic apparatus according to various embodiments.

Referring to FIG. 5A, a first graph 510 may depict an initial noise situation in case of the closed state 505 (e.g., closed state 410 in FIG. 4A) of a slidable electronic apparatus (e.g., the electronic apparatus 101 in FIG. 1) according to various embodiments. The closed state 410 may correspond to a state in which a second housing (e.g., the second housing 230 in FIG. 2A and FIG. 2B) is included (received) in a first housing (e.g., the first housing 210 in FIG. 2A and FIG. 2B) of the electronic apparatus 101. In the closed state 410, the second housing 230 may be completely inserted into the first housing 210 so that the second housing 230 is not exposed to the outside. In the closed state 410, only a first area (e.g., the first area A1 in FIG. 2A and FIG. 2B and the first area 411 in FIG. 4A) of a flexible display (e.g., the display module 160 in FIG. 1) may be exposed through an exterior surface (e.g., a first direction or the front surface of the electronic apparatus 101) and a second area (e.g., the second area A2 in FIG. 2A and FIG. 2B) of the display module 160 may not be exposed to the outside.

A y-axis of the first graph 510 may indicate raw data with respect to touch noise and an x-axis may correspond to the first area A1. Referring to the first graph 510, the initial touch noise (or touch sensitivity) in the closed state 410 may vary for each area of the first area A1. A first digitizer module (e.g., the first digitizer module 301 in FIG. 3) included in the first housing 210 may be driven and a second digitizer module (e.g., the second digitizer module 303 in FIG. 3) included in the second housing 230 may not be driven. The touch layer included in the display panel of the display module 160 may be affected by external noise, noise by a display panel, or noise by a digitizer module. Because the second digitizer module 303 may affect touch noise of the first area A1 in the closed state 410, the electronic apparatus 101 may not drive the second digitizer module 303 in the closed state 410. The electronic apparatus 101 may apply the first touch filter f1 to the first area A1 in the closed state 410. Based on the first touch filter f1 being applied to the first area A1, the touch noise for each area of the first area A1 may be equalized by uniformly correcting the touch baseline in response to the first area A1 (e.g., smoothing a touch raw data slope or lowering same to a value of "0").

FIG. 5B is a view illustrating an example of application of a touch filter in the open state of an electronic apparatus according to various embodiments.

Referring to FIG. 5B, a second graph 520 may depict an initial noise situation in case of the open state 515 (e.g., open state 450 in FIG. 4C) of the electronic apparatus 101. The open state 450 may refer to a state in which the second housing 230 is exposed to the outside of the first housing 210. In the open state 450, the second housing 230 may be maximally moved to the outside of the first housing 210 so that the second housing 230 is exposed to the outside. The open state 450 may correspond to a state in which the first area A1 and the second area A2 of the display module 160 are exposed through an exterior surface (e.g., the front surface of the electronic apparatus 101). In the open state 450, the second area A2 may face the first direction (e.g., the front surface of the electronic apparatus 101) similarly to the first area A1.

A y-axis of the second graph 520 may indicate raw data with respect to touch noise and an x-axis may correspond to the first area A1 and the second area A2. Referring to the second graph 520, initial touch noise may appear differently in the first area A1 and the second area A2 in the open state 450. In the open state 450, the first digitizer module 301 included in the first housing 210 may be driven and the second digitizer module 303 included in the second housing 230 may be driven. In the open state 450, the first digitizer module 301 and the second digitizer module 303 may affect touch noise of the first area A1 and the second area A2. The electronic apparatus 101 may apply the first touch filter f1 to the first area A1 and the second touch filter f2 to the second area A2 in the open state 450.

A third graph 530 depicts touch noise after the first touch filter f1 is applied to the first area A1 and the second touch filter f2 is applied to the second area A2 in the open state 450. Based on different touch filters being applied to the first area A1 and the second area A2, the touch noise of the first area A1 and the second area A2 may be equalized by uniformly correcting the touch baseline in response to the first area A1 and the second area A2.

FIG. 5C is a view illustrating an example of application of a touch filter in the intermediate state of an electronic apparatus according to various embodiments.

Referring to FIG. 5C, a fourth graph 540 may depict an initial noise situation in case of the intermediate state 535 (e.g., intermediate state 430 in FIG. 4B) of the electronic apparatus 101. The intermediate state 430 may refer to a state in which a portion of the second housing 230 is exposed to the outside of the first housing 210. In the intermediate state 430, a portion (e.g., the second area 433 in FIG. 4B) of the first area A1 and the second area A2 of the display module 160 may be exposed through an exterior surface (e.g., the front surface of the electronic apparatus 101), and another portion (e.g., portion 440 in FIG. 4B) of the second area A2 may face an opposite direction (e.g., the second direction or the rear surface of the electronic apparatus 101) to the first area A1.

A y-axis of the fourth graph 540 may indicate raw data with respect to touch noise and an x-axis may correspond to the first area 431, the second area 433, and the third area 435 in FIG. 4A to FIG. 4C. The first area 431 may be an area exposed through the first housing 210 and not overlapping the second housing 230. The second area 433 may be an area where the second housing 230 is exposed to the outside of the first housing 210 and which does not overlap the first housing 210. The third area 435 may be an area where the first housing 210 overlaps the second housing 230 when the second housing 230 is received inside the first housing 210. Referring to the fourth graph 540, initial touch noise may be large in the order of the third area 435, the first area 431, and the second area 433 in the intermediate state 430. Because the touch noise is inversely proportional to a distance, as the distance between the first digitizer module 301 or the second digitizer module 303 and the display module 160 increases, the touch noise may decrease.

For example, the second area 433 may correspond to the second distance d2 between the second digitizer module 303 and the display module 160, and the first area 431 may correspond to the first distance d1 between the first digitizer module 301 and the display module 160. Because the first digitizer module 301 is disposed in the first housing 210, the second digitizer module 303 is disposed in the second housing 230, and the second digitizer module 303 is disposed below the first digitizer module 301, the first distance d1 may be shorter than the second distance d2 (e.g., d2>d1). Furthermore, because the third area 435 corresponds to a portion of the first area A1 and a portion of the second area A2, the first digitizer module 301 corresponding to the third area 435 may be driven and the second digitizer module 303 corresponding to the third area 435 may not be driven. The third area 435 may be affected by the first digitizer module 301 and the second digitizer module 303.

The fifth graph 550 may depict touch noise after the first touch filter f1 is applied to the first area 431 to the third area 435. It may be identified that based on only the first touch filter f1 being applied, touch noise exists with respect to the second area 433 and touch noise with respect to the third area 435 is relatively large. Because touch noise is different for each area (e.g., the first area 431 to the third area 435) of the display module 160 in the intermediate state 430, the electronic apparatus 101 may apply touch filters differently to each area of the display module 160.

A sixth graph 560 may depict touch noise after the first touch filter f1 is applied to the first area 431, the second touch filter f2 is applied to the second area 433, and the third touch filter f3 is applied to the third area 435. In the intermediate state 430, the electronic apparatus 101 may apply the first touch filter f1 to the first area 431, the second touch filter f2 to the second area 433, and the third touch filter f3 to the third area 435. The second touch filter may be smaller than the first touch filter. The third touch filter may be equal to or greater than a sum value of the first touch filter f1 and the second touch filter f2.

Figure 6:
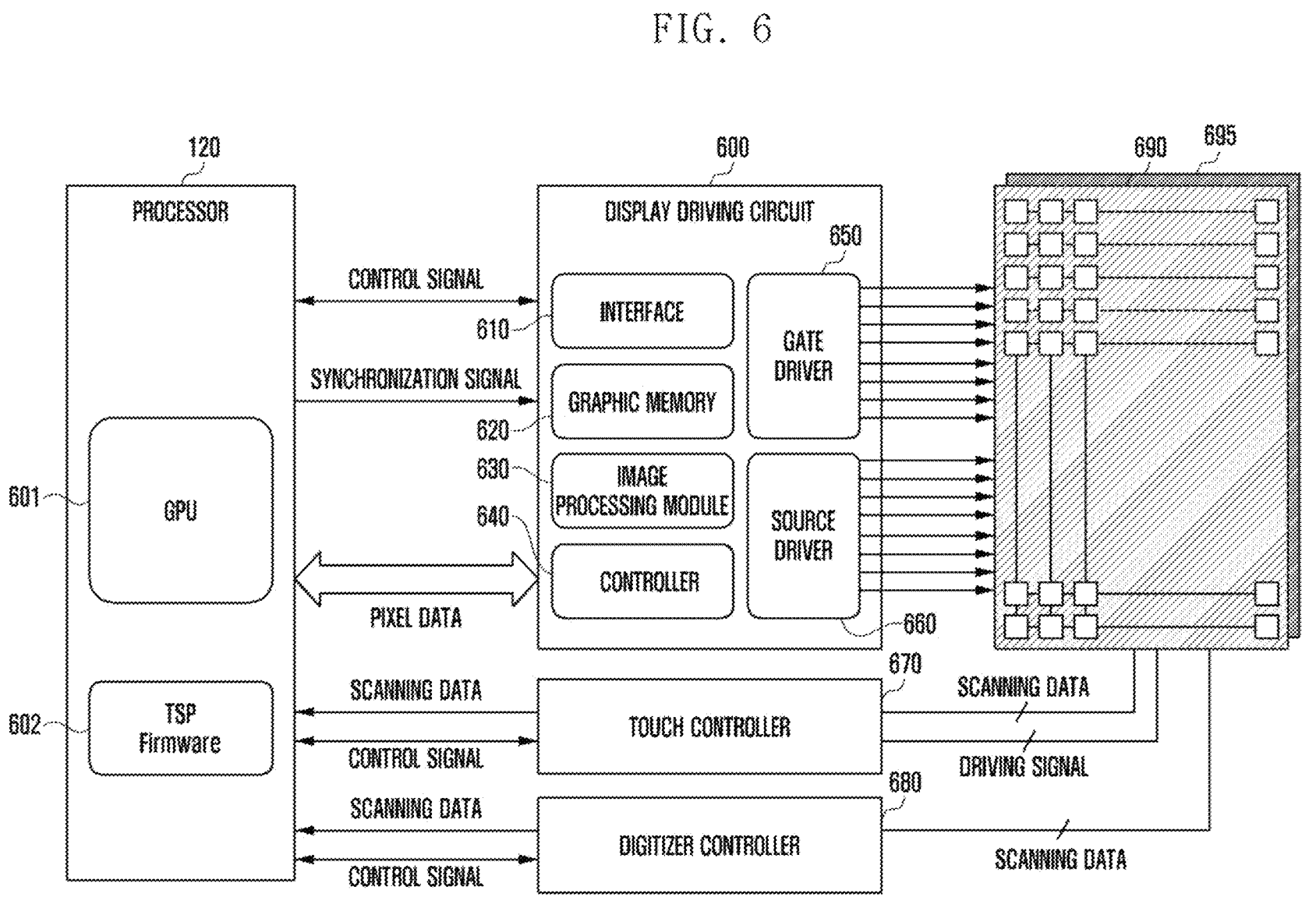

FIG. 6 is a view illustrating an example of including a digitizer module and a display driving circuit of an electronic apparatus according to various embodiments.

Referring to FIG. 6, a slidable electronic apparatus (e.g., the electronic apparatus 101 in FIG. 1) according to various embodiments may include a processor (e.g., the processor 120 in FIG. 1), a display driving circuit 600, a touch controller 670, a digitizer controller 680, a display panel 690, or a digitizer module 695. Although FIG. 6 illustrates one digitizer module 695, the slidable electronic apparatus 101 may include two digitizer modules (e.g., the first digitizer module 301 and the second digitizer module 303 in FIG. 3). The slidable-shape electronic apparatus 101 may include a flexible display (e.g., the display module 160 in FIG. 1), and the display module 160 may include the display driving circuit 600 and the display panel 690.

The processor 120 may generate a user interface to be displayed on the display panel 690 and determine a screen refresh rate based on the generated user interface. The processor 120 may include a graphic processing unit (GPU) 601 and TSP firmware 602. The processor 120 may transmit a control signal with respect to the screen refresh rate or pixel data (or image data) corresponding to the user interface to the display driving circuit 600 through the GPU 601. The processor 120 may calculate coordination information acquired from the touch controller 670 by the TSP firmware 602.

The display driving circuit 600 (which may be referred to as display driver integrated circuit (DDI)) may include an interface 610, a graphic memory 620, an image processing module 630, a controller 640, a gate driver 650, or a source driver 660. The interface 610 may receive image data from the processor 120. The image data may include still image data or moving image data (or video data). The interface 610 may transfer the image data received from the processor 120 to the graphic memory 620 or the controller 640.

The graphic memory 620 may store the image data received through the interface 610. For example, the graphic memory 620 may perform buffering on the received image data before transferring the image data to another component (e.g., the image processing module 630, the gate driver 650, or the source driver 660). According to an embodiment, the graphic memory 620 may transfer the stored image data to the image processing module 630. The image processing module 630 may process the image data to improve a quality of the image data. According to various embodiments, the display driving circuit 600 may include one or more image processing modules 630. According to an embodiment, the image processing module 630 may transfer the processed image data to the gate driver 650 or the source driver 660.

The controller 640 may control an operation of the display driving circuit 600. The controller 640 may include a timing controller for signal synchronization when processing the image data. According to an embodiment, the controller 640 may transfer a control signal corresponding to the screen refresh rate to the gate driver 650 or the source driver 660.

The gate driver 650 or the source driver 660 (or data driver) may be operated according to control of the controller 640. The gate driver 650 may operate by scanning scan lines connected to pixels of the display panel 690. The gate driver 650 may transmit a scan signal through the scan lines. The source driver 660 may drive the scan lines connected to pixels of the display panel 690.

The touch controller 670 (or touch IC) may control a touch layer included in the display panel 690. The touch controller 670 may control the touch layer to detect a touch input or a hovering input for a predetermined location of the display panel 690. The digitizer controller 680 (or digitizer IC) may control the digitizer module 695 included (or disposed) below the display panel 690. The digitizer controller 680 may control the digitizer module 695 to detect a digitizer input (e.g., a pen input) for a predetermined location of the display panel 690. In embodiments, the digitizer module 695 may correspond to at least one of the first digitizer module 301 and the second digitizer module 303.

The display panel 690 may include multiple pixels arranged in a matrix shape, and a scan signal line and a data signal line corresponding to the multiple pixels may be connected to the display driving circuit 600. A touch layer (or touch sensor) may be included in the display panel 690. The digitizer module 695 may be an input device used to read coordinates, which are analog data, and input drawings or figures designed in digital form.

Figure 7:
FIG. 7 is a view illustrating a touch controller of an electronic apparatus according to various embodiments.

FIG. 7 is a view illustrating a touch controller of an electronic apparatus according to various embodiments.

Referring to FIG. 7, a slidable electronic apparatus (e.g., the electronic apparatus 101 in FIG. 1) according to various embodiments may include a touch controller 700 (e.g., the touch controller 670 in FIG. 6). A flexible display (e.g., the display module 160 in FIG. 1) of the electronic apparatus 101 may include a touch TX/RX electrode pattern in a metal mesh shape. The display module 160 may include a first area (e.g., the first area A1 in FIG. 2A and FIG. 2B) corresponding to a first housing (e.g., the first housing 210 in FIG. 2A and FIG. 2B) and a second area (e.g., the second area A2 in FIG. 2A and FIG. 2B) extending from the first area A1, and received in the rear surface of a second housing (e.g., the second housing 230 in FIG. 2A and FIG. 2B) or exposed to the outside of the first housing 210 through the front surface of the second housing 230 as the second housing 230 moves.

In case of no input, the touch controller 700 may sense, with the RX electrode pattern, an electromagnetic or electrical field (E-field) amount generated by a power signal (e.g., a voltage) driving in a specific frequency band on the TX electrode pattern. When a finger input occurs, an E-field signal coupled to the RX electrode may be reduced. The signal sensed through the RX electrode may go through touch filters 710 and 720 of the touch controller 700 to be converted into a digital signal through an analog-digital converter (ADC) and stored in an internal register. A value stored in the register may be transferred to a processor (e.g., the processor 120 in FIG. 1) and calculated to coordinate information by the TSP firmware. Each of the touch filters 710 and 720 may include a low pass filter or a demodulator. The touch filter 710 or 720 may be respectively connected to the RX electrode pattern. The processor 120 may apply different configuration values (or parameters) to the touch filters 710 and 720 based on a state change of the electronic apparatus 101.

According to various embodiments, based on the electronic apparatus 101 being in a closed state (e.g., the closed state 410 in FIG. 4A), the processor 120 may apply a first touch filter to the first area A1 of the display module 160. The closed state 410 may correspond to a state in which the second housing 230 is included (received) in the first housing 210 of the electronic apparatus 101.

According to various embodiments, based on the electronic apparatus 101 being in an intermediate state (e.g., the intermediate state 430 in FIG. 4B), the processor 120 may apply a first touch filter to the first area 431 of the display module 160, a second touch filter to the second area 433 of the display module 160, and a third touch filter to the third area 435 of the display module 160. The intermediate state 430 may refer to a state in which a portion of the second housing 230 is exposed to the outside of the first housing 210. In the intermediate state 430, a portion of the first area A1 and the second area A2 of the display module 160 may be exposed through an exterior surface (e.g., the front surface of the electronic apparatus 101), and another portion (e.g., portion 440 in FIG. 4B) of the second area A2 may face an opposite direction (e.g., the second direction or the rear surface of the electronic apparatus 101) to the first area A1.

According to various embodiments, in the intermediate state 430 of the electronic apparatus 101, the processor 120 may determine a touch filter to be applied to the third area 435 based on a driving method of a second digitizer module (e.g., the second digitizer module 303 in FIG. 3A and FIG. 3B). Based on the entire area of the second digitizer module 303 being driven in the intermediate state 430 of the electronic apparatus 101, the processor 120 may apply the third touch filter to the third area 435. In embodiments, based on only a partial area (e.g., the second area 433) of the second digitizer module 303 being driven in the intermediate state 430 of the electronic apparatus 101, the processor 120 may apply the first touch filter or the second touch filter to the third area 435. In embodiments, regardless of the driving state of the second digitizer module 303 in the intermediate state 430 of the electronic apparatus 101, the processor 120 may apply the third touch filter to the third area 435.

The first area 431 may be an area exposed through the first housing 210 and not overlapping the second housing 230. The first area 431 may be an area smaller than the first area A1 in FIG. 2A and FIG. 2B. The second area 433 may be an area where the second housing 230 is exposed to the outside of the first housing 210 and which does not overlap the first housing 210. The second area 433 may correspond to a portion (e.g., A2-1) of the second area A2 in FIG. 2A and FIG. 2B and may be an area smaller than the second area A2 in FIG. 2A and FIG. 2B. The third area 435 may be an area where the first housing 210 overlaps the second housing 230 when the second housing 230 is received inside the first housing 210. The third area 435 may correspond to a portion of the first area A1 in FIG. 2A and FIG. 2B or another portion of the second area A2 in FIG. 2A and FIG. 2B. Based on the electronic apparatus 101 being in the intermediate state 430, the processor 120 may apply different touch filter for each area (e.g., the first area 431 to the third area 435) of the display module 160.

According to various embodiments, in an open state (e.g., the open state 450 in FIG. 4C) of the electronic apparatus 101, the processor 120 may apply a first touch filter to a first area A1 of the display module 160, and a second touch filter to a second area A2 of the display module 160. The open state 450 may refer to a state in which the second housing 230 is exposed to the outside of the first housing 210. The open state 450 may correspond to a state in which the first area A1 and the second area A2 of the display module 160 are exposed through an exterior surface (e.g., the front surface of the electronic apparatus 101). In the open state 450, the second area A2 may face the first direction (e.g., the front surface of the electronic apparatus 101) similarly to the first area A1.

An electronic apparatus (e.g., the electronic apparatus 101 in FIG. 1) according to various embodiments of the disclosure may include a first housing (e.g., the first housing 210 in FIG. 2A and FIG. 2B), a second housing (e.g., the second housing 230 in FIG. 2A and FIG. 2B) formed to be movable from the first housing, and received inside the first housing or exposed to the outside of the first housing, a flexible display (e.g., the display module 160 in FIG. 1) including a first area (e.g., the first area A1 in FIG. 2A and FIG. 2B) and a second area (e.g., the second area A2 in FIG. 2A and FIG. 2B) which extends from the first area and is received on the rear surface of the second housing, or becomes exposed to the outside of the first housing through the front surface of the second housing as the second housing moves, a first digitizer module (e.g., the first digitizer module 301 in FIG. 3) located in the first housing and located below the flexible display, a second digitizer module (e.g., the second digitizer module 303 in FIG. 3) located in the second housing and located below the first digitizer module in a state in which the second housing is received inside the first housing, a memory (e.g., the memory 130 in FIG. 1), and a processor (e.g., the processor 120 in FIG. 1) operatively connected to the flexible display, the first digitizer module, the second digitizer module, or the memory, wherein the processor senses the movement of the second housing with respect to the first housing and configures a different touch filter for each area of the flexible display based on the movement of the second housing.

The processor may be configured to apply a first touch filter to the first area of the flexible display in a state in which the second housing is received inside the first housing.

The processor may be configured to apply a first touch filter to the first area of the flexible display and apply a second touch filter to the second area in a state in which the second housing is exposed to the outside of the first housing.

The first touch filter may be configured to have a value smaller than the second touch filter.

In a state in which a portion of the second housing is received inside the first housing and another portion of the second housing is exposed to the outside of the first housing, the processor may be configured to apply a first touch filter to a third area (e.g., the first area 431 in FIG. 4B), a second touch filter to a fourth area (e.g., the second area 433 in FIG. 4B), and a third filter to a fifth area (e.g., the third area 435 in FIG. 4B).

The third area may be smaller than the first area of the flexible display, the fourth area may be smaller than the second area of the flexible display, and the fifth area may be formed of the first area and the second area of the flexible display overlapping each other.

The first touch filter may be configured to have a value smaller than that of the second touch filter and the third touch filter may be configured to have a value larger than a sum of a value configured to the first touch filter and a value configured to the second touch filter.

The processor may be configured to control the first digitizer module to be driven and the second digitizer module not to be driven in a state in which the second housing is received inside the first housing.

The processor may be configured to control the first digitizer module and the second digitizer module to be driven in a state in which the second housing is exposed to the outside of the first housing.

The processor may control the second digitizer module so that a partial area thereof is not sensed in a state in which a portion of the second housing is received inside the first housing and another portion of the second housing is exposed to the outside of the first housing.

The processor may control the second digitizer module so that a partial area thereof corresponding to a partial area of the second housing received inside the first housing is not sensed, and another partial area thereof corresponding to another partial area of the second housing exposed to the outside of the first housing is sensed.

The processor may be configured to apply a touch filter to the flexible display and then update a touch baseline based on the touch filter.

Figure 8:
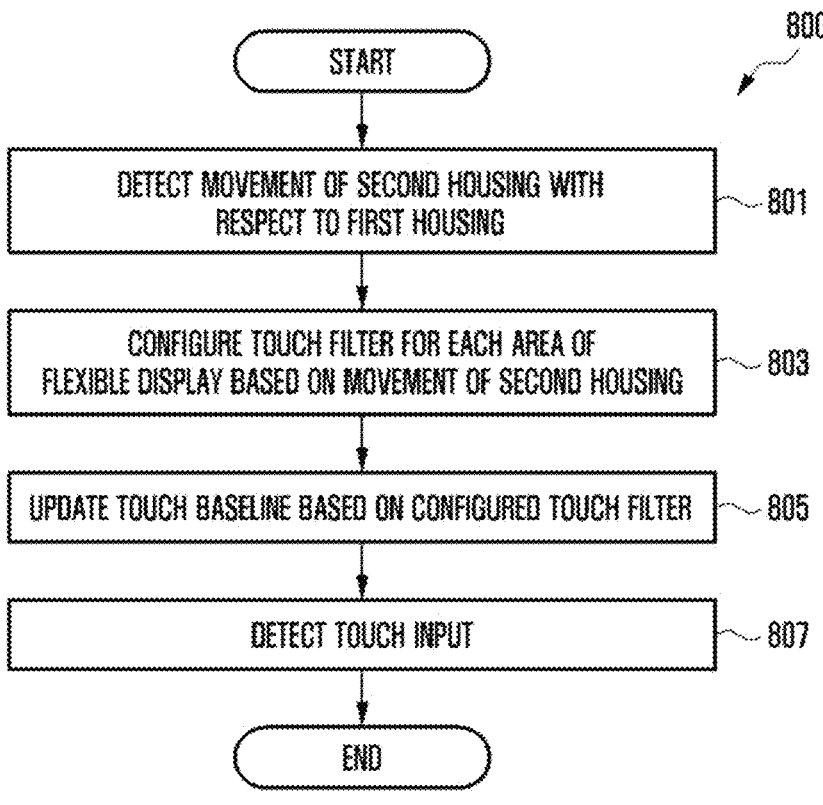
FIG. 8 is a flowchart illustrating an operation method of an electronic apparatus according to various embodiments.

FIG. 8 is a flowchart 800 illustrating an operation method of an electronic apparatus according to various embodiments.

Referring to FIG. 8, in operation 801, a processor (e.g., the processor 120 in FIG. 1) of a slidable electronic apparatus (e.g., the electronic apparatus 101 in FIG. 1) according to various embodiments may detect movement of a second housing (e.g., the second housing 230 in FIG. 2A and FIG. 2B) with respect to a first housing (e.g., the first housing 210 in FIG. 2A and FIG. 2B). The electronic apparatus 101 may include the first housing 210 and the second housing 230, the second housing 230 may be received inside the first housing 210 in a closed state of the electronic apparatus 101, and the second housing 230 may be exposed to the outside of the first housing 210 in an open state of the electronic apparatus 101. The first housing 210 is a main housing of the electronic apparatus 101 and may receive various electrical and electronic components such as a main circuit board or a battery. The first housing 210 may be fixed and the second housing 230 may be disposed to be capable of reciprocating by a predetermined distance from the first housing 210 in a designated direction (e.g., the −x-axis direction D). The second housing 230 may be slidable from the first housing 210. A sliding structure may be provided between the first housing 210 and the second housing 230 for sliding of the second housing 230.

In operation 803, the processor 120 may configure a touch filter for each area of a flexible display (e.g., the display module 160 in FIG. 1) based on the movement of the second housing 230. The display module 160 may include a first area (e.g., the first area A1 in FIG. 2A and FIG. 2B) and a second area (e.g., the second area A2 in FIG. 2A and FIG. 2B) extending from the first area A1, and received in the rear surface of the second housing 230 or exposed to the outside of the first housing 210 through the front surface of the second housing 230 as the second housing 230 moves. According to various embodiments, based on the electronic apparatus 101 being in a closed state (e.g., the closed state 410 in FIG. 4A), the processor 120 may apply a first touch filter to the first area A1 of the display module 160. The closed state 410 may correspond to a state in which the second housing 230 is included (received) in the first housing 210 of the electronic apparatus 101.

According to various embodiments, based on the electronic apparatus 101 being in an intermediate state (e.g., the intermediate state 430 in FIG. 4B), the processor 120 may apply a first touch filter to the first area 431 of the display module 160, a second touch filter to the second area 433 of the display module 160, and a third touch filter to the third area 435 of the display module 160. The second touch filter f2 may be smaller than the first touch filter f1. The third touch filter f3 may be equal to or greater than a sum value of the first touch filter f1 and the second touch filter f2. The intermediate state 430 may refer to a state in which a portion of the second housing 230 is exposed to the outside of the first housing 210. In the intermediate state 430, a portion of the first area A1 and the second area A2 of the display module 160 may be exposed through an exterior surface (e.g., the front surface of the electronic apparatus 101), and another portion of the second area A2 may face an opposite direction (e.g., the second direction or the rear surface of the electronic apparatus 101) to the first area A1.

The first area 431 may be an area exposed through the first housing 210 and not overlapping the second housing 230. The first area 431 may be an area smaller than the first area A1 in FIG. 2A and FIG. 2B. The second area 433 may be an area where the second housing 230 is exposed to the outside of the first housing 210 and which does not overlap the first housing 210. The second area 433 may correspond to a portion (e.g., A2-1) of the second area A2 in FIG. 2A and FIG. 2B and may be an area smaller than the second area A2 in FIG. 2A and FIG. 2B. The third area 435 may be an area where the first housing 210 overlaps the second housing 230 when the second housing 230 is received inside the first housing 210. The third area 435 may correspond to a portion of the first area A1 in FIG. 2A and FIG. 2B or another portion of the second area A2 in FIG. 2A and FIG. 2B. Based on the electronic apparatus 101 is in the intermediate state 430, the processor 120 may apply different touch filter for each area (e.g., the first area 431 to the third area 435) of the display module 160.

According to various embodiments, in the intermediate state 430 of the electronic apparatus 101, the processor 120 may determine a touch filter to be applied to the third area 435 based on a driving method of a second digitizer module (e.g., the second digitizer module 303 in FIG. 3A and FIG. 3B). Based on the entire area of the second digitizer module 303 being driven in the intermediate state 430 of the electronic apparatus 101, the processor 120 may apply the third touch filter to the third area 435. In embodiments, based on only a partial area (e.g., the second area 433) of the second digitizer module 303 is driven in the intermediate state 430 of the electronic apparatus 101, the processor 120 may apply the first touch filter or the second touch filter to the third area 435. In embodiments, regardless of the driving state of the second digitizer module 303 in the intermediate state 430 of the electronic apparatus 101, the processor 120 may apply the third touch filter to the third area 435.

According to various embodiments, based on the electronic apparatus 101 being in the intermediate state 430, the processor may apply a value (an intermediate filter value between the first touch filter f1 and the third touch filter f3 (e.g., the second touch filter f2)) between the first touch filter f1 and the third touch filter f3 to a configured area (e.g., a boundary area) between the first area 431 and the third area 435 and apply a filter value between the second touch filter f2 and the third touch filter f3 to a configured area between the second area 433 and the third area 435. In embodiments, the processor 120 may apply the first touch filter f1 (e.g., a lager value between the first touch filter f1 and the third touch filter f3) to a configured area (e.g., a boundary area) between the first area 431 and the third area 435 and apply the second touch filter f2 (e.g., a larger value between the second touch filter f2 and the third touch filter f3) to a configured area between the second area 433 and the third area 435.

According to various embodiments, in an open state (e.g., the open state 450 in FIG. 4C) of the electronic apparatus 101, the processor 120 may apply a first touch filter to a first area A1 of the display module 160, and a second touch filter to a second area A2 of the display module 160. The open state 450 may refer to a state in which the second housing 230 is exposed to the outside of the first housing 210. The open state 450 may correspond to a state in which the first area A1 and the second area A2 of the display module 160 are exposed through an exterior surface (e.g., the front surface of the electronic apparatus 101). In the open state 450, the second area A2 may face the first direction (e.g., the front surface of the electronic apparatus 101) similarly to the first area A1.

In operation 805, the processor 120 may update the touch baseline based on the configured touch filter. The touch baseline may refer to a capacitor value associated with touch detection. Considering that the touch layer may detect a touch input based on a capacitor value change, based on the base line being not equalized, an AFE value may be distorted, and touch misrecognition may occur due to an influence of noise. The processor 120 may update the touch baseline based on a state change of the electronic apparatus 101. For example, based on a first touch filter being applied to the first area A1 of the display module 160 in the closed state 410 of the electronic apparatus 101, the processor 120 may update a touch baseline of the first area A1 based on the first touch filter.

Based on the first touch filter being applied to the first area 431, the second touch filter is applied to the second area 433, and the third touch filter is applied to the third area 435 in the intermediate state 430 of the electronic apparatus 101, the processor 120 may update a touch baseline of the first area 431 based on the first touch filter, update a touch baseline of the second area 433 based on the second touch filter, and update a touch baseline of the third area 435 based on the third touch filter. For example, based on the first touch filter being applied to the first area 451, and the second touch filter being applied to the second area 453, in the open state 450 of the electronic apparatus 101, the processor 120 may update a touch baseline of the first area 451 based on the first touch filter, and update a touch baseline of the second area 453 based on the second touch filter.

In operation 807, the processor 120 may detect a touch input. The touch layer (or touch sensor) may be affected by external noise, noise by a display panel, or noise by a digitizer module. Based on the touch layer being affected by noise, touch misrecognition may occur. Because touch noise is removed by operation 801 to operation 805, the processor 120 may determine whether a touch input by a user finger or an object (e.g., an electronic pen) is a valid touch input and detect same as a touch input. The touch detection is performed by a capacitance method and thus a valid touch input may indicate determining that a touch input is made by user's intention based on a capacitance value generated by a touch input being greater than or equal to (or exceeding) a configured capacitance value. In case a capacitance value generated by a touch input is less than (or less than or equal to) a configured capacitance value, the processor 120 may determine the capacitance value as a capacitance value change due to external noise rather than a touch input by a user's intention.

Figure 9:
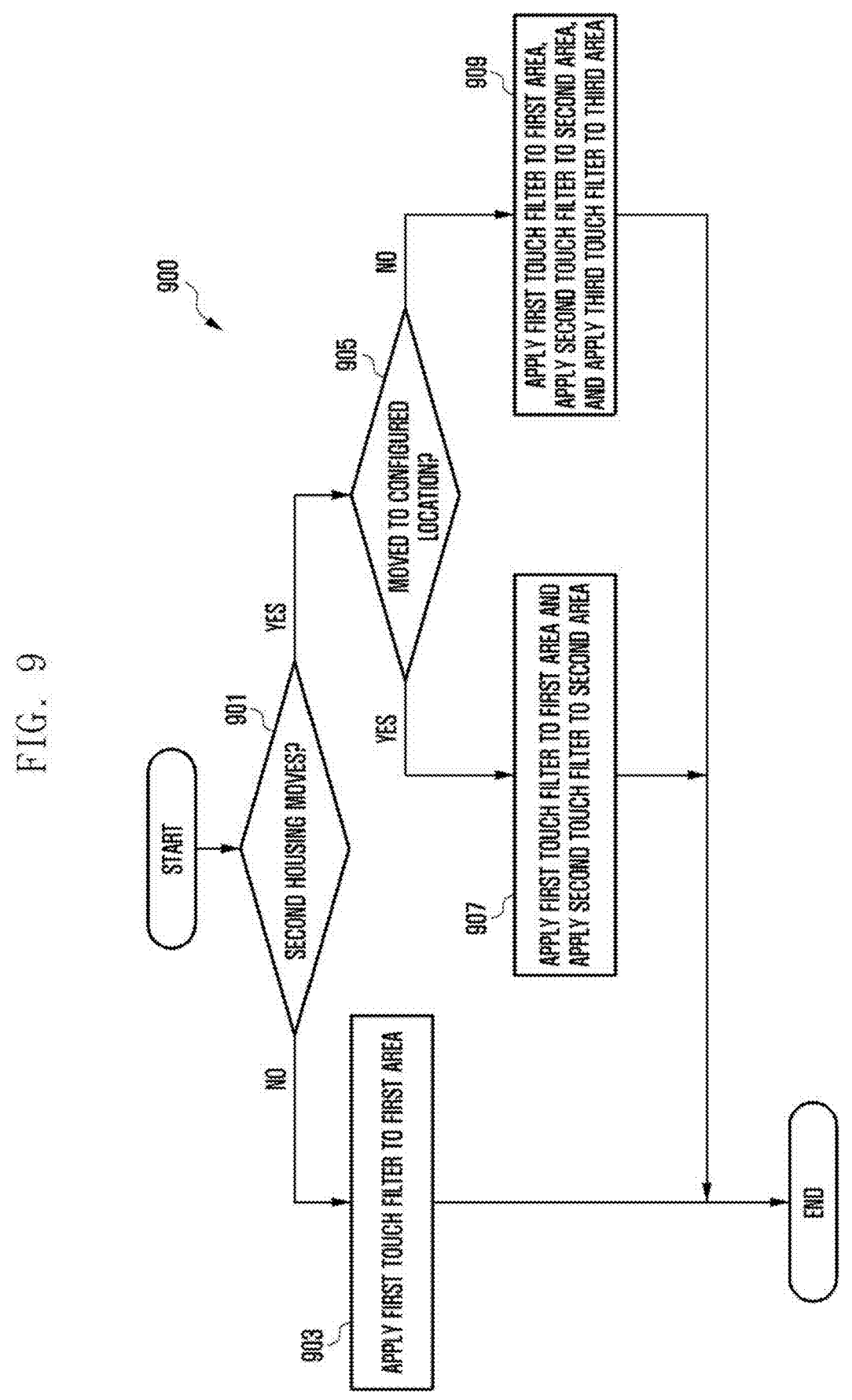
FIG. 9 is a flowchart illustrating a method for configuring a touch filter based on movement of a housing of an electronic apparatus according to various embodiments.

FIG. 9 is a flowchart 900 illustrating a method for configuring a touch filter based on movement of a housing of an electronic apparatus according to various embodiments. One or more of the operations of FIG. 9 may correspond to operation 803 of FIG. 8.

Referring to FIG. 9, in operation 901, a processor (e.g., the processor 120 in FIG. 1) of a slidable electronic apparatus (e.g., the electronic apparatus 101 in FIG. 1) according to various embodiments may detect movement of a second housing (e.g., the second housing 230 in FIG. 2A and FIG. 2B). The electronic apparatus 101 may include a first housing (e.g., the first housing 210 in FIG. 2A and FIG. 2B) and the second housing 230, the second housing 230 may be received inside the first housing 210 in a closed state of the electronic apparatus 101, and the second housing 230 may be exposed to the outside of the first housing 210 in an open state of the electronic apparatus 101. The first housing 210 may be fixed and the second housing 230 may be disposed to be capable of reciprocating by a predetermined distance from the first housing 210 in a designated direction (e.g., the −x-axis direction D). The second housing 230 may be slidable from the first housing 210. A sliding structure may be provided between the first housing 210 and the second housing 230 for sliding of the second housing 230. The processor 120 may perform operation 905 based on the second housing 230 being moved, and perform operation 903 based on the second housing 230 being not moved.

Based on the second housing 230 being not moved, in operation 903, the processor 120 may apply a first touch filter to a first area (e.g., the first area A1 in FIG. 2A and FIG. 2B) of a flexible display (e.g., the display module 160 in FIG. 1). The display module 160 may include the first area A1 and a second area (e.g., the second area A2 in FIG. 2A and FIG. 2B) extending from the first area A1, and received in the rear surface of the second housing 230 or exposed to the outside of the first housing 210 through the front surface of the second housing 230 as the second housing 230 moves. The second housing 230 being not moved may indicate a closed state (e.g., the closed state 410 in FIG. 4A) of the electronic apparatus 101. The closed state 410 may correspond to a state in which the second housing 230 is included (received) in the first housing 210 of the electronic apparatus 101. The processor 120 may apply a first touch filter to the first area A1 of the display module 160 in the closed state 410. The processor 120 may perform operation 805 of FIG. 8 after applying the first touch filter.

In operation 905, based on the second housing 230 being moved, the processor 120 may determine whether the second housing 230 is moved to a configured location. The configured location may refer to a furthest location to which the second housing 230 may move from the first housing 210. For example, moving of the second housing 230 to a configured location may indicate conversion of the electronic apparatus 101 to an open state (e.g., the open state 450 in FIG. 4C). The processor 120 may perform operation 907 based on the second housing 230 being moved to a configured location, and perform operation 909 based on the second housing 230 being not moved to a configured location.

In operation 907 based on the second housing 230 being moved to a configured location, the processor 120 may apply a first touch filter to the first area A1 of the display module 160, and a second touch filter to the second area A2 of the display module 160. The moving of the second housing 230 to a configured location may indicate conversion (or changing) of the electronic apparatus 101 to the open state (e.g., the open state 450 in FIG. 4C). The open state 450 may correspond to a state in which the first area A1 and the second area A2 of the display module 160 are exposed through an exterior surface (e.g., the front surface of the electronic apparatus 101). In the open state 450, the second area A2 may face the first direction (e.g., the front surface of the electronic apparatus 101) similarly to the first area A1. In the open state 450 of the electronic apparatus 101, the processor 120 may apply a first touch filter to the first area A1 of the display module 160, and a second touch filter to the second area A2 of the display module 160.

In operation 909 based on the second housing 230 being not moved to a configured location, the processor 120 may apply a first touch filter to the first area 431 of the display module 160, a second touch filter to the second area 433 of the display module 160, and a third touch filter to the third area 435 of the display module 160. The second housing 230 being not moved to a configured location may indicate conversion (or changing) of the electronic apparatus 101 to the intermediate state (e.g., the intermediate state 430 in FIG. 4B). The intermediate state 430 may refer to a state in which a portion of the second housing 230 is exposed to the outside of the first housing 210. In the intermediate state 430, a portion (e.g., the second area 433 in FIG. 4B) of the first area A1 and the second area A2 of the display module 160 may be exposed through an exterior surface (e.g., the front surface of the electronic apparatus 101), and another portion (e.g., portion 440 in FIG. 4B) of the second area A2 may face an opposite direction (e.g., the second direction or the rear surface of the electronic apparatus 101) to the first area A1.

Based on the electronic apparatus 101 being in the intermediate state 430, the processor 120 may apply different touch filter for each area (e.g., the first area 431 to the third area 435) of the display module 160. For example, in the intermediate state 430 of the electronic apparatus 101, the processor 120 may apply a first touch filter to a first area 431 of the display module 160, a second touch filter to a second area 433 of the display module 160, and a third touch filter to a third area 435 of the display module 160. The second touch filter f2 may be smaller than the first touch filter f1. The third touch filter f3 may be equal to or greater than a sum value of the first touch filter f1 and the second touch filter f2.

According to various embodiments, based on the electronic apparatus 101 being in the intermediate state 430, the processor 120 may determine a touch filter to be applied to the third area 435 based on a driving method of a second digitizer module (e.g., the second digitizer module 303 in FIG. 3A and FIG. 3B). Based on the entire area of the second digitizer module 303 being driven in the intermediate state 430 of the electronic apparatus 101, the processor 120 may apply the third touch filter to the third area 435. In embodiments, based on only a partial area (e.g., the second area 433) of the second digitizer module 303 being driven in the intermediate state 430 of the electronic apparatus 101, the processor 120 may apply the first touch filter or the second touch filter to the third area 435. In embodiments, regardless of the driving state of the second digitizer module 303 in the intermediate state 430 of the electronic apparatus 101, the processor 120 may apply the third touch filter to the third area 435.

According to various embodiments, based on the electronic apparatus 101 being in the intermediate state 430, the processor may apply a value (e.g., an intermediate filter value) between the first touch filter f1 and the third touch filter f3 to a configured area (e.g., a boundary area) between the first area 431 and the third area 435 and apply a filter value between the second touch filter f2 and the third touch filter f3 to a configured area between the second area 433 and the third area 435. In embodiments, the processor 120 may apply the first touch filter f1 (e.g., a lager value between the first touch filter f1 and the third touch filter f3) to a configured area (e.g., a boundary area) between the first area 431 and the third area 435 and apply the second touch filter f2 (e.g., a larger value between the second touch filter f2 and the third touch filter f3) to a configured area between the second area 433 and the third area 435.

An operation method of an electronic apparatus (e.g., the electronic apparatus 101 in FIG. 1) according to various embodiments of the disclosure may include an operation of detecting movement of a second housing (e.g., the second housing 230 in FIG. 2A and FIG. 2B) of the electronic apparatus, which is formed to be movable from a first housing (e.g., the first housing 210 in FIG. 2A and FIG. 2B) and may be received inside the first housing or exposed to the outside of the first housing, and an operation of configuring a different filter for each area of a flexible display (e.g., the display module 160 in FIG. 1) of the electronic apparatus based on the movement of the second housing, wherein the electronic apparatus may include a first digitizer module (e.g., the first digitizer module 301 in FIG. 3) disposed in the first housing and disposed below the flexible display, and a second digitizer module (e.g., the second digitizer module 303 in FIG. 3) disposed in the second housing and disposed below the first digitizer module in a state in which the second housing is received inside the first housing, and the flexible display may include a first area (e.g., the first area A1 in FIG. 2A and FIG. 2B) and a second area (e.g., the second area A2 in FIG. 2A and FIG. 2B) extending from the first area to be received in the rear surface of the second housing or exposed to the outside of the first housing through the front surface of the second housing according to movement of the second housing.

The operation of configuring may include an operation of applying a first touch filter to the first area of the flexible display in a state in which the second housing is received inside the first housing.

The operation of configuring may include an operation of applying a first touch filter to the first area of the flexible display and a second touch filter to the second area in a state in which the second housing is exposed to the outside of the first housing, wherein the first touch filter is configured to have a value smaller than that of the second touch filter.

The configuring operation may include an operation of applying a first touch filter to the third area, a second touch filter to the fourth area, and a third filter to the fifth area in a state in which a portion of the second housing is received inside the first housing and another portion of the second housing is exposed to the outside of the first housing, wherein the first touch filter is configured to have a value smaller than that of the second touch filter, and the third touch filter is configured to have a value larger than a sum of a value configured to the first touch filter and a value configured to the second touch filter.

The method may further include an operation of controlling the first digitizer module to be driven and the second digitizer not to be driven in a state in which the second housing is received inside the first housing.

The method may further include an operation of controlling the first digitizer module and the second digitizer to be driven in a state in which the second housing is exposed to the outside of the first housing.

The method may further include, in a state in which a portion of the second housing is received inside the first housing and another portion of the second housing is exposed to the outside of the first housing, an operation of controlling the second digitizer module so that a partial area thereof corresponding to a partial area of the second housing received inside the first housing is not sensed, and another partial area thereof corresponding to another partial area of the second housing exposed to the outside of the first housing is sensed.

The method may further include an operation of updating a touch baseline based on the touch filter after applying a touch filter to the flexible display.

Figure 10:
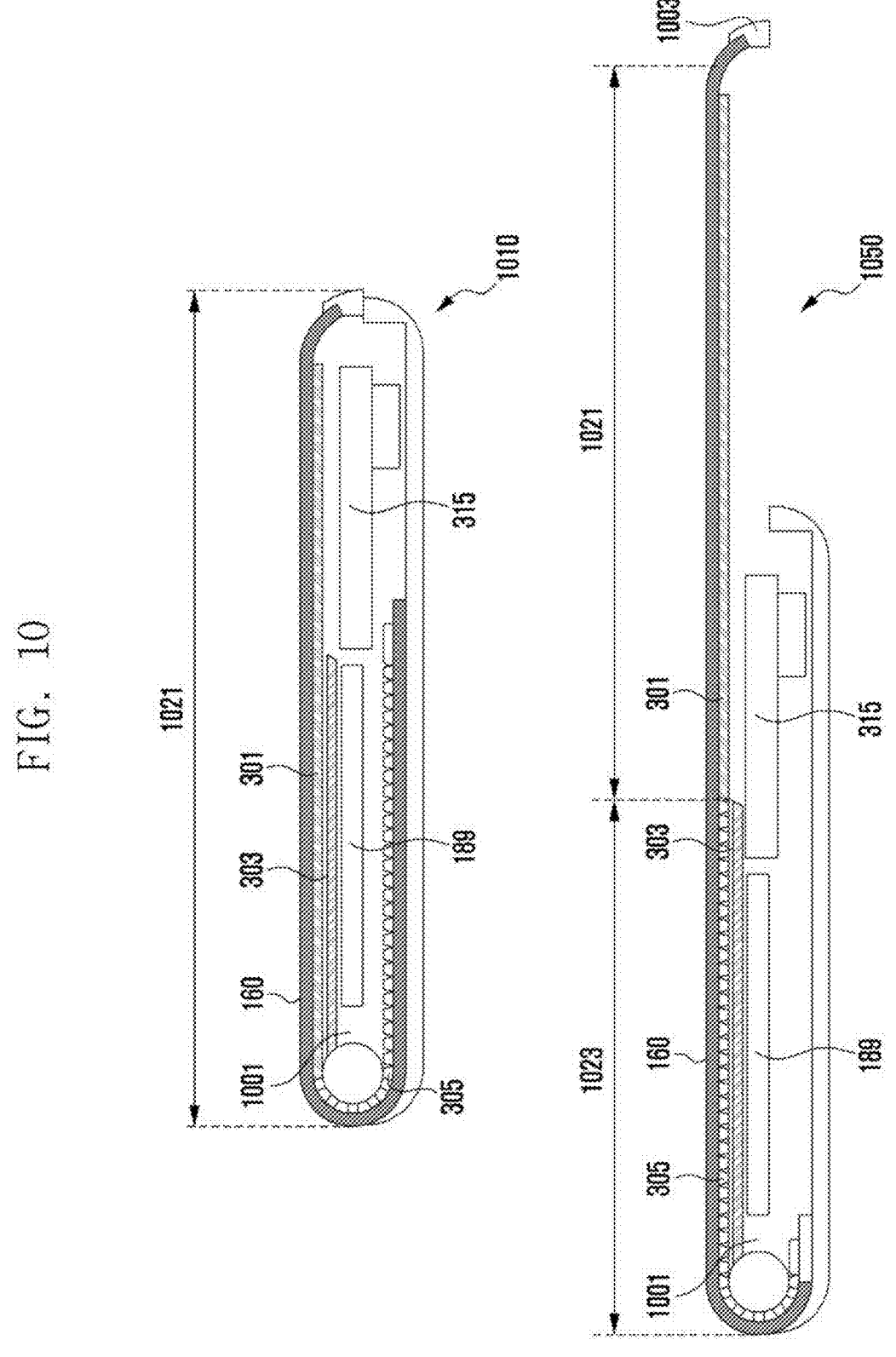
FIG. 10 is a view illustrating another example of a disposition of a digitizer module of an electronic apparatus according to various embodiments.

FIG. 10 is a view illustrating another example of disposition of a digitizer module of an electronic apparatus according to various embodiments.

Referring to FIG. 10, an electronic apparatus (e.g., the electronic apparatus 101 in FIG. 1) according to various embodiments may include a first digitizer module (e.g., the first digitizer module 301 in FIG. 3) below a flexible display (e.g., the display module 160 in FIG. 1) and a second digitizer module (e.g., the second digitizer module 303 in FIG. 3) below the first digitizer module 301 in the closed state 1010. The display module 160 may include a first area 1021 (e.g., the first area A1 in FIG. 2A and FIG. 2B) and a second area 1023 (e.g., the second area A2 in FIG. 2A and FIG. 2B). For example, in the closed state 1010, the first area 1021 may face a first direction (e.g., the front surface of the electronic apparatus 101) and the second area 1023 may face a second direction (e.g., the rear surface of the electronic apparatus 101). In the open state 1050, the first area 1021 and the second area 1023 may face a first direction (e.g., the front surface).

A location of the first area 1021 may be moved according to a state change (e.g., from the closed state 1010 to the open state 1050) of the electronic apparatus 101. The second area 1023 may extend from the first area 1021, may be received inside the first housing 1001 in the closed state 1010, and may be exposed to the outside of the first housing 1001 in the open state 1050. The first digitizer module 301 may be disposed to correspond to the first area 1021 and the second digitizer module 303 may be fixed to the first housing 1001. In the closed state 1010 and the open state 1050, the first digitizer module 301 and the second digitizer module 303 may face the first direction (e.g., the front surface of the electronic apparatus 101).

In FIG. 3, the first area may be fixed to a first housing (e.g., the first housing 210 in FIG. 2A and FIG. 2B) so as not to be moved even when the electronic apparatus 101 is changed from a closed state (e.g., the closed state 310 in FIG. 3) to an open state (e.g., the open state 350 in FIG. 3). In FIG. 3, the first digitizer module 301 may be fixed to the first housing 210 so as not to be moved even when the electronic apparatus 101 is changed from the closed state 310 to the open state 350.

The first area 1021 of FIG. 10 may be not fixed to the first housing 1001 so that the first area may be moved based on the electronic apparatus 101 being changed from the closed state 1010 to the open state 1050. In FIG. 10, based on the electronic apparatus 101 being changed to the open state 1050, the display module 160 including the first area 1021 and the second housing 1003 including the first digitizer module 301 may be moved. For example, according to a change of the electronic apparatus 101 to the open state 1050, the second housing 1003 may be moved from the first housing 1001 in a designated direction (e.g., the +x-axis direction).

The first digitizer module 301 disposed to correspond to the first area 1021 may be moved from the first housing 1001 in a designated direction (e.g., the +x-axis direction) in response to the first area 1021 according to a change of the electronic apparatus 101 to the open state 1050. Based on the electronic apparatus 101 being changed to the open state 1050, the first digitizer module 301 is moved and the second digitizer module 303 fixedly disposed in the first housing 1001 may be exposed to the first direction (e.g., the front surface of the electronic apparatus 101) through the second area 1023. In the closed state 1010, the second digitizer module 303 may be disposed below the first digitizer module 301 not to be exposed, and when the electronic apparatus 101 is changed to the open state 1050, the second digitizer module 303 may be exposed to the outside as the first digitizer module 301 disposed on the second digitizer module 303 moves.

The embodiments disclosed in the specification and the drawings are merely presented as examples and are not intended to limit the scope of the disclosure. Therefore, the scope of the disclosure should be construed as encompassing all changes or modifications derived from the technical ideas of the disclosure in addition to the embodiments disclosed herein.

What is claimed is:

1. An electronic apparatus comprising:
a first housing;
a second housing configured to be slidable in and out of the first housing such that the second housing is received inside the first housing in a closed state and is exposed outside of the first housing in an open state;
a flexible display comprising a touch sensor for detecting a touch input, wherein the flexible display includes a first area corresponding to the first housing and a second area, wherein the second area extends from the first area and is configured to be received on a rear surface of the second housing in the closed state, and to be exposed outside of the first housing through a front surface of the second housing as the second housing moves to the open state;
a first digitizer module configured to detect a pen input and disposed in the first housing below the flexible display;
a second digitizer module configured to detect the pen input and disposed in the second housing between the first digitizer module and the second area in the closed state, and to be disposed in the second housing between the second area and the rear surface of the second housing in the open state;
a memory storing instructions; and
a processor,
wherein the instructions, when executed by the processor, cause the electronic apparatus to:
detect a movement of the second housing with respect to the first housing; and
update a capacitor value associated with a touch detection of the touch sensor differently to each respective area of the flexible display based on the movement of the second housing.

2. The electronic apparatus of claim 1, wherein the instructions, when executed by the processor, cause the electronic apparatus to update a first capacitor value of the touch sensor to the first area of the flexible display in the closed state.

3. The electronic apparatus of claim 1, wherein the instructions, when executed by the processor, cause the electronic apparatus to update a first capacitor value of the touch sensor to the first area of the flexible display and update a second capacitor value of the touch sensor to the second area in the open state.

4. The electronic apparatus of claim 3, wherein the first capacitor value corresponding to the touch sensor is smaller than the second capacitor value corresponding to the touch sensor.

5. The electronic apparatus of claim 1, wherein the instructions, when executed by the processor, cause the electronic apparatus to, based on a first portion of the second housing being received inside the first housing and a second portion of the second housing being exposed outside of the first housing, update a first capacitor value of the touch sensor to a third area of the flexible display, update a second capacitor value of the touch sensor to a fourth area of the flexible display, and update a third capacitor value of the touch sensor to a fifth area of the flexible display.

6. The electronic apparatus of claim 5, wherein the third area is smaller than the first area,
wherein the fourth area is smaller than the second area, and
wherein the fifth area comprises an area of the flexible display in which the first area and the second area overlap.

7. The electronic apparatus of claim 5, wherein the second capacitor value of the touch sensor is smaller than the first capacitor value of the touch sensor, and
wherein the third capacitor value of the touch sensor is larger than a sum of the first capacitor value of the touch sensor and the second capacitor value of the touch sensor.

8. The electronic apparatus of claim 1, wherein the instructions, when executed by the processor, cause the electronic apparatus to control the first digitizer module to be driven and the second digitizer module to be not driven in the closed state.

9. The electronic apparatus of claim 1, wherein the instructions, when executed by the processor, cause the electronic apparatus to control the first digitizer module and the second digitizer module to be driven in the open state.

10. The electronic apparatus of claim 1, wherein the instructions, when executed by the processor, cause the electronic apparatus to control a first partial area of the second digitizer module is not sensed based on a first portion of the second housing being received inside the first housing and a second portion of the second housing being exposed outside of the first housing.

11. The electronic apparatus of claim 10, wherein the first partial area corresponds to the first portion of the second housing,
wherein the instructions, when executed by the processor, cause the electronic apparatus to control the second digitizer module so that a second partial area of the second digitizer module is sensed, and
wherein the second partial area corresponds to the second portion of the second housing.

12. The electronic apparatus of claim 1, wherein the instructions, when executed by the processor, cause the electronic apparatus to update the capacitor value of the touch sensor to the flexible display, and then update a touch baseline based on the capacitor value of the touch sensor.

13. An operation method of an electronic apparatus, the method comprising:
detecting a movement of a second housing of the electronic apparatus, wherein the second housing is configured to be slidable in and out of a first housing of the electronic apparatus the second housing being received inside the first housing in a closed state and being exposed outside of the first housing in an open state, wherein the electronic apparatus includes a first digitizer module configured to detect a pen input and disposed in the first housing below a flexible display of the electronic apparatus, and a second digitizer module configured to detect the pen input and disposed in the second housing; and
updating a capacitor value associated with a touch detection of a touch sensor differently for each respective area of the flexible display based on the movement of the second housing, wherein the flexible display includes a first area, and a second area extending from the first area and configured to be received in a rear surface of the second housing in the closed state and exposed outside of the first housing through a front surface of the second housing according to the movement of the second housing to the open state, and the touch sensor for detecting a touch input, wherein the second digitizer module is configured to be disposed between the first digitizer module and the second area in the closed state, and to be disposed in the second housing between the second area and the rear surface of the second housing in the open state.

14. The method of claim 13, wherein the configuring comprises updating a first capacitor value of the touch sensor to the first area of the flexible display in the closed state.

15. The method of claim 13, wherein the configuring comprises updating a first capacitor value of the touch sensor to the first area and updating a second capacitor value of the touch sensor to the second area in the open state, and wherein the first capacitor value corresponding to the touch sensor is smaller than the second capacitor value corresponding to the touch sensor.

16. The method of claim 13, wherein the configuring comprises updating a first capacitor value of the touch sensor to a third area, a second capacitor value of the touch sensor to a fourth area, and a third capacitor value of the touch sensor to a fifth area in a state in which a portion of the second housing is received inside the first housing and another portion of the second housing is exposed to the outside of the first housing, and wherein the first capacitor value of the touch sensor is configured to have a value smaller than that of the second capacitor value of the touch sensor, and the third capacitor value of the touch sensor is configured to have a value larger than a sum of a value configured to the first capacitor value of the touch sensor and a value configured to the second capacitor value of the touch sensor.

17. The method of claim 13, further comprising controlling the first digitizer module to be driven and the second digitizer module not to be driven in the closed state.

18. The method of claim 13, further comprising controlling the first digitizer module and the second digitizer module to be driven in the open state.

19. The method of claim 13, further comprising in a state in which a portion of the second housing is received inside the first housing and another portion of the second housing is exposed to the outside of the first housing, an operation of controlling the second digitizer module so that a partial area thereof corresponding to a partial area of the second housing received inside the first housing is not sensed, and another partial area thereof corresponding to another partial area of the second housing exposed to the outside of the first housing is sensed.

20. The method of claim 13, further comprising updating a touch baseline based on the capacitor value of the touch sensor after updating the capacitor value of the touch sensor to the flexible display.

* * * * *